US007685384B2

(12) United States Patent
Shavit

(10) Patent No.: US 7,685,384 B2
(45) Date of Patent: Mar. 23, 2010

(54) SYSTEM AND METHOD FOR REPLICATING FILES IN A COMPUTER NETWORK

(75) Inventor: Tsachi Chuck Shavit, Lexington, MA (US)

(73) Assignee: GlobalSCAPE, Inc., San Antonio, TX (US)

( * ) Notice: Subject to any disclaimer, the term of this patent is extended or adjusted under 35 U.S.C. 154(b) by 758 days.

(21) Appl. No.: 11/029,554

(22) Filed: Jan. 5, 2005

(65) Prior Publication Data

US 2005/0177603 A1 Aug. 11, 2005

Related U.S. Application Data

(60) Provisional application No. 60/542,078, filed on Feb. 6, 2004.

(51) Int. Cl.
G06F 12/12 (2006.01)
(52) U.S. Cl. ............... 711/162; 711/161; 711/E12.022
(58) Field of Classification Search ......... 711/161–162; 707/204
See application file for complete search history.

(56) References Cited

U.S. PATENT DOCUMENTS

| | | | | |
|---|---|---|---|---|
| 5,765,173 A * | 6/1998 | Cane et al. | ................. | 707/204 |
| 5,819,020 A | 10/1998 | Beeler, Jr. | ............... | 395/182.03 |
| 5,974,563 A * | 10/1999 | Beeler, Jr. | ................. | 714/5 |
| 6,014,676 A * | 1/2000 | McClain | ................. | 707/204 |
| 6,038,665 A * | 3/2000 | Bolt et al. | ................. | 713/176 |
| 6,085,298 A * | 7/2000 | Ohran | ................. | 711/162 |
| 6,101,507 A | 8/2000 | Cane et al. | ................. | 707/204 |
| 6,157,991 A * | 12/2000 | Arnon | ................. | 711/161 |
| 6,304,882 B1 | 10/2001 | Strellis et al. | ............... | 707/202 |
| 6,324,654 B1 * | 11/2001 | Wahl et al. | ................. | 714/6 |
| 6,397,307 B2 * | 5/2002 | Ohran | ................. | 711/161 |
| 6,397,308 B1 * | 5/2002 | Ofek et al. | ................. | 711/162 |
| 6,434,681 B1 * | 8/2002 | Armangau | ................. | 711/162 |

(Continued)

Primary Examiner—Reginald G Bragdon
Assistant Examiner—Kenneth M Lo
(74) Attorney, Agent, or Firm—Jackson Walker L.L.P.

(57) ABSTRACT

A system and method for performing real-time replication of data across a network is provided. A mirroring engine receives a write request from a host application operating on a source computer. The mirroring engine compares data in the write request with corresponding data stored in memory. If data in the write request differs from stored data, the mirroring engine processes the write request. Processing involves computing a data signature across data in the write request and associating the signature with a transaction number and a status byte. The transaction number is used to uniquely identify the data signature and can be used to ensure that the signature is properly handled if it is received, for example, out of order. The status byte contains information used for handling the data signature and transaction number as well as information identifying how the data signature was computed. In an embodiment, the status byte may contain a bit for identifying if the data signature was computed across an entire block of data or if the signature was computed over only a portion of a data block, such as for example, only data bytes that have changed as compared with those in the stored data. Processing may further include compressing and encrypting the data signature, transaction number and status byte prior to transmission over a network. Embodiments may further employ a meta-file for storing data signatures, transaction numbers, status bytes, and other information useful for performing real-time data replication over a network.

1 Claim, 18 Drawing Sheets

U.S. PATENT DOCUMENTS

| | | | |
|---|---|---|---|
| 6,513,065 B1 * | 1/2003 | Hafez et al. | 709/224 |
| 6,615,223 B1 | 9/2003 | Shih et al. | 707/201 |
| 6,665,780 B1 | 12/2003 | Bradley | 711/162 |
| 6,711,572 B2 | 3/2004 | Zakharov et al. | 707/10 |
| 6,941,396 B1 * | 9/2005 | Thorpe et al. | 710/74 |
| 2004/0054711 A1 | 3/2004 | Multer | 709/201 |
| 2004/0205310 A1 | 10/2004 | Yamagami | 711/162 |
| 2005/0050286 A1 * | 3/2005 | Crowley et al. | 711/162 |
| 2005/0071586 A1 * | 3/2005 | Bartfai et al. | 711/162 |
| 2005/0091391 A1 * | 4/2005 | Burton et al. | 709/230 |
| 2005/0114614 A1 * | 5/2005 | Anderson et al. | 711/162 |

* cited by examiner

SYSTEM AND METHOD FOR REPLICATING FILES IN A COMPUTER NETWORK

CROSS REFERENCES TO RELATED APPLICATIONS

The instant application claims priority under 35 U.S.C. § 119 to provisional application 60/542,078 filed Feb. 6, 2004 and having title, "Temporal Signature-Based Opened-File Replication for Computer-Based Electronic Files," the content of the above application is herein incorporated by reference in its entirety.

BACKGROUND OF THE INVENTION

Computers have become essential elements in the day-to-day operation of many enterprises such as, for example, corporations, governments, and educational institutions. Many of these computers operate in cooperation with other computers and data processing devices by way of communication networks. Networked computers routinely accept, process, display and transmit data when running software applications such as, for example, database applications, stock trading applications, computer aided design (CAD) applications, data analysis and modeling applications, and order processing applications. Data residing on networked computers may be essential to the operation of a project or enterprise. Furthermore, the data may be difficult, or impossible, to replace if it becomes lost, damaged, or corrupted.

Enterprises may utilize data backup, or archiving technologies in order to reliably create duplicate data sets for use in the event that a primary, or master, data set becomes corrupted. Prior art data archiving techniques may employ creation of an entire duplicate data set at fixed intervals, for example, daily, weekly, or monthly. The archived data may be written to tape, a separate hard drive, to CD-ROM, etc. When data files become large, performing archives of an entire master data file can take many hours. In addition, the archive can utilize almost one-hundred percent of a network's bandwidth if the archive is saved to a remote device coupled to the network.

When data files change often, such as numerous times throughout a day, maintaining up-to-date data archives may become problematic due to the amount of time and network resources required to archive master data throughout the day. Failure to maintain up-to-date data archives can greatly increase the amount of time necessary to recover from a disaster such as a crashed hard drive, a fire, an act of sabotage, etc.

Prior art techniques may further attempt to archive data in ways other than replicating an entire data set or storage system. An example of an alternative backup technique is referred to as a transaction-based backup. A transaction-based backup involves the transmission of a high level transaction to a remote file server in its entirety. High level transactions are typically specific to a particular application such as a database application. Therefore, use of such an approach can be database-engine specific, and therefore may have to be implemented as part of the database application itself. As a result, this approach can be costly since the particular application may have to be modified and further can require large amounts of network bandwidth since the entire high level transaction is sent to the remote file server.

Another prior art technique is referred to as disk mirroring. Disk based mirroring, as the name implies, involves replicating the contents of a disk on a remote device. Implementations of disk based mirroring may replicate, or mirror, actual disk writes, including sector locations and sector data from the primary server to a remote server. Use of disk mirroring requires the use of very high reliability and high bandwidth communications networks as well as requiring identical disk hardware on both the primary server and remote server.

Still another replication technique used in the art is referred to as file based mirroring. File based mirroring involves the replication of files, or portions thereof, from a primary server to a remote server. File based mirroring may include transmission of an entire file or may involve the transmission of file portions in order to conserve network bandwidth. When portions of files are transferred, problems can arise if a transmitted portion is lost, arrives out of order, or becomes corrupted. When a problem arises, prior art techniques may retransmit an entire data file resulting in inefficient use of network bandwidth.

What is needed is a data backup technique for maintaining up-to-date archives on an ongoing basis. In addition, the backup technique should efficiently use network bandwidth and further should not be overly burdensome to the processing capabilities on the master or remote computers. Furthermore, the master computer should send updates to the remote site in substantially real-time, when feasible. In addition, the data backup technique should use data compression and error detection protocols in a manner avoiding the re-transmission of large volumes of data whenever an error occurs.

SUMMARY OF THE INVENTION

Aspects of the invention facilitate substantially real-time synchronization of a primary, or master, file resident on a primary server with its corresponding replica, or backup file, which is resident on a remote file system. Real-time as used herein refers to operations that occur sufficiently fast so as to appear to be occurring without objectionable delay to a human observer. Synchronization is achieved by reliably mirroring data to the remote file system very soon after the data is modified on the primary server. In addition, embodiments of the invention can be implemented without changing or modifying host application(s) generating and/or modifying the mirrored primary files. Furthermore, only the actual changes to the primary file are mirrored. Since only the changed portions of the primary file data are sent to the remote system, embodiments of the invention efficiently utilize network bandwidth. In fact, the amount of data exchanged between a primary server and backup server is typically a small fraction when compared to the actual size of the data written to the corresponding file on the primary server itself. Furthermore, the order of data write operations on a given file is maintained between the primary server and backup server; in addition, the ordering of writes between files is maintained.

In the event that the primary server, the backup server, or the network suffers an outage, or interruption, embodiments of the invention ensure that the primary file and backup file match before again commencing the continuous replication process. In addition, data mirroring implemented in accordance with aspects of the invention preserves the order of data changes thus facilitating efficient re-transmission of corrupted or misplaced data changes. Furthermore, the invention can asynchronously mirror data while both the primary and remote file systems are operating thus alleviating the need to have the primary file closed in order to perform data mirroring and further reducing the demands placed on the systems during mirroring operations. In addition, preferred embodiments ensure that replicated data is identical to corresponding source file data prior to updating the replicated data on the backup server. This approach prevents accumulation of errors as would occur if updates were made to a replicated file that did not contain a true copy of data making up the source file.

In accordance with an aspect of the invention, a method for replicating data is provided. A host software application is operated in conjunction with a primary file server. The application further outputs one-or-more write operations. The write operation is received and this data is compared to stored data which is associated with a primary, or source, file resident on the primary server. An index is then generated. This index references a changed data byte within the primary file. A changed byte occurs when a data byte within the data written by the host application does not substantially match a corresponding stored data byte in the stored data. Then, the index is provided to a meta-file for use in replicating the changed data byte. A mirroring engine receives the index and further uses a transaction number to uniquely identify the changed data byte. The mirroring engine can also queue the changed data byte prior to transmission across a communications network to a remote server.

In accordance with another aspect of the invention, a method for performing real-time replication of data across a communications network is provided. A meta-file is opened and a check is made to determine if the meta-file was properly closed after previous access. The meta-file includes a block signature which represents a data block associated with a source computer. In addition, the meta-file further includes a transaction number for facilitating identification of the data block. Communication is then established with a remote computer having replicated data stored thereon in memory. The remote computer provides a remote meta-file to a source computer. The remote meta-file includes, among other things, a remote block signature and a remote transaction number. The source computer then compares the received remote meta-file to the meta-file residing thereon to determine if the data was properly replicated from the source computer to the remote computer over the communications network.

In accordance with yet another aspect of the invention, a method for replicating data across a communications network is provided. A data packet is received over a network. This received packet contains one-or-more primary file changes which are, respectively, represented by changed data. In addition, the received packet further includes a data signature representing a changed data byte within a data block associated with a source computer. The received packet further includes a transaction number, assigned by a remote server, which is used to uniquely identify the changed byte. A remote data signature is then computed for a remote data block residing in a memory associated with a remote computer. And, a determination is made as to whether the data signature and the remote data signature match. A match between the remote data signature and the data signature indicates that the contents of the data block and remote data block are substantially the same, or identical.

In accordance with still another aspect of the invention, a system for replicating data in substantially real-time is provided. The system includes a primary server, or computer, having a communication interface for making a data packet containing at least a portion of a new data block available to a network having a storage device containing stored data which includes a plurality of stored data blocks, and further having a processor for executing instructions to enable receipt of a new data block from a host application. The processor further compares the new data block to a corresponding portion of the stored data. In addition, the processor interacts with a meta-data file after processing the new data block using a hash function. The system also includes a network for conveying a data packet from the primary server to a remote server. The remote server further receives the data packet and processes it in a manner facilitating real-time replication of the transmitted data.

In accordance with still another aspect of the invention, a computer-readable data transmission for facilitating real-time data replication across a data communications network is provided. The data transmission includes an open file status indicator, a header portion containing information useful for determining if a meta-file was properly closed after a prior access, a block temporal'signature portion containing a data block signature and a transaction number and a status portion containing information about the data signature.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF EXEMPLARY EMBODIMENTS

Subheadings used hereinbelow are to assist the reader and should not be construed as defining or in any way limiting embodiments and implementations of the invention. In addition, the disclosure includes examples which are illustrative in nature and are not intended to limit the disclosed invention in anyway.

Embodiments of the invention replicate data from a primary server to a remote server in substantially real-time. Real-time operation is facilitated by transmitting only those portions of the data that have changed. Furthermore, data changes are compressed using data compression techniques known in the relevant arts in order to further reduce the amount of data transmitted over a network. Hash functions are used in conjunction with other information making up a block temporal signature so that transmitted data can be verified, the ordering of data can be maintained, and so that corrupted data can be identified and re-transmitted without requiring re-transmission of uncorrupted data. Corrupted data may include, but is not limited to, data that arrives out of order and data that contains errors.

Exemplary Implementation for Performing Data Mirroring

Figure 1A:
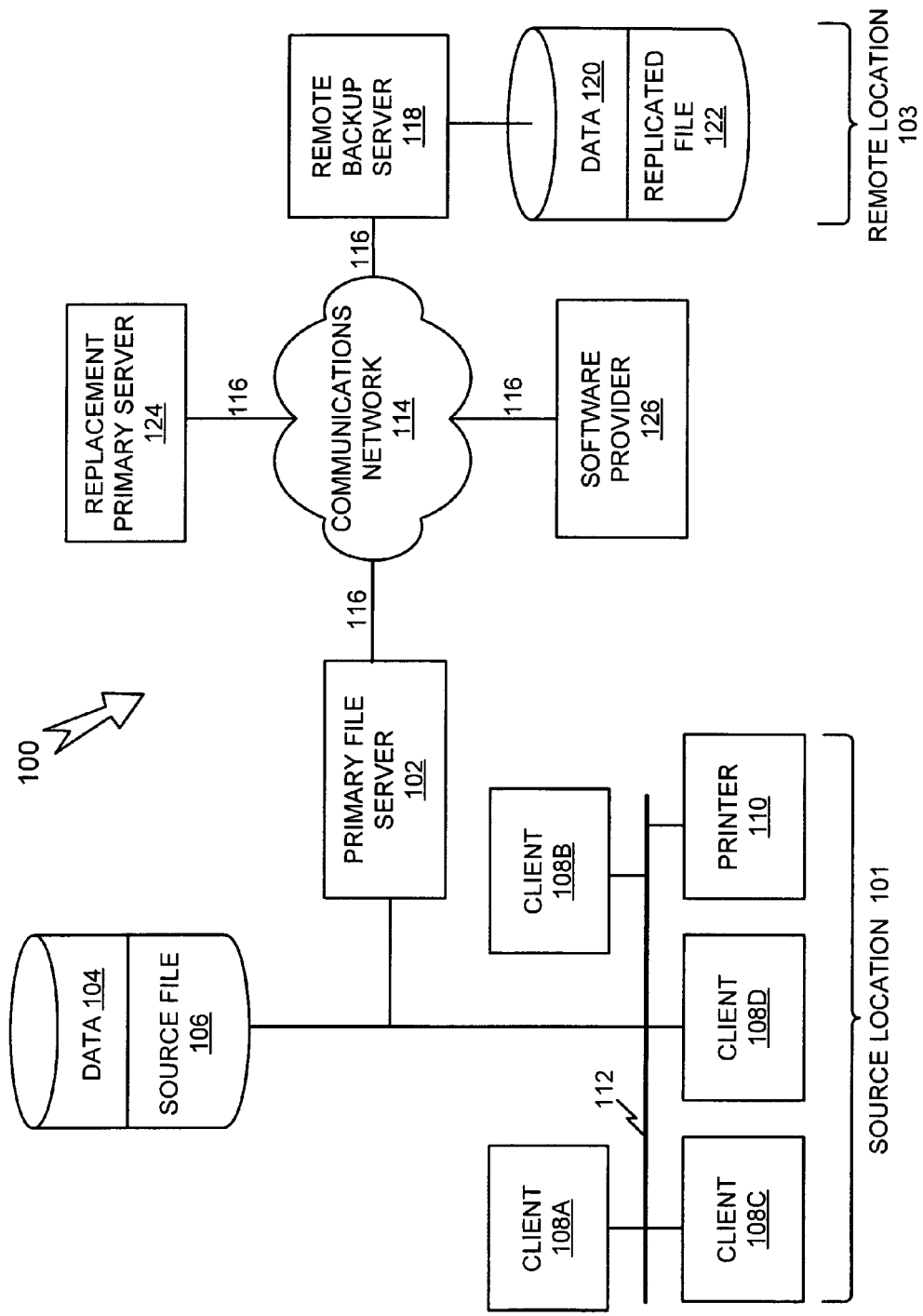
FIG. 1A illustrates an exemplary system for performing data replication between a primary server and a remote backup server in accordance with aspects of the invention.

FIG. 1A illustrates an exemplary system 100 for performing data mirroring across a communications network. System 100 may include, among other things, a primary file server 102, a data repository 104 having a source file 106, client computers 108A-D, a printer 110, a local area network (LAN) 112, a communications network 114, communications links 116, a remote backup server 118, a remote data repository 120 having a replicated file 122, a replacement primary file server 124, and a software provider 126.

Primary server, or computer, 102 may include substantially any type of device capable of manipulating machine-readable data and instructions in conjunction with a processing device; however, in many implementations of preferred embodiments, primary server 102 is implemented as a conventional server architecture consisting of a computer adapted to a particular purpose using hardware, software or a combination thereof. Server 102 may operate a software application for providing a specific type of service to one-or-more clients 108. Furthermore, server 102 may share its resources among other devices coupled to LAN 112 or network 114. By way of example, primary server 102 may be a database server providing database interactive connectivity to clients 108. Or, alternatively, primary server 102 can be a web server providing interactive connectivity and content to a plurality of users. While primary server 102 may typically consist of a workstation, it is not limited thereto and may consist of a personal computer or other device capable of processing machine-readable instructions for performing one-or-more operations to achieve a desired result, or outcome. Since primary server 102 acts as the source of file writes, which are replicated across a network, primary server 102 is also referred to as a source server or a source computer.

Primary server 102 operates in conjunction with a host application which may be any type of software application capable of generating data writes to a computer-readable storage medium. A host application, as well as other software implemented functions associated with preferred embodiments, may be implemented in high level programming languages such as, for example, C++, LISP, and JAVA; or alternatively, the host application can be implemented in a low level programming language such as assembly code.

Data repository 104 may include hardware and/or software for storing and handling data bytes, records and files in a machine, or computer, readable format. For example, data repository 104 may include a storage disk, a redundant array of independent storage disks (RAID), a network attached storage system (NAS), or a firmware memory such as a solid state disk or flash memory. Data repository 104 may further be communicatively coupled to primary server 102 using a bus or network connection such as a network interface card (NIC).

Source, or primary, file 106 refers to a file associated with primary server 102 and which is capable of association with computer-readable data. For example, a source file 106, also referred to as file-master, may consist of a database file containing information about employees, an online ordering application for manipulating transaction data used in e-commerce applications, data associated with a document, data associated with a digital image, multi-media data associated with a web conferencing application, or system files used to ensure proper operation of primary server 102. In addition, source file 106 may create, use, or manipulate data structures resident in a computer-readable storage medium such as a random access memory (RAM). In many applications, source file 106 will undergo many changes over a 24-hour period. These changes may occur as data is added or removed from source file 106, as data is manipulated within source file 106, or as data in source file 106 is affected by other applications, events or circumstances. Furthermore, primary server 102 may operate on a plurality of source files 106 essentially simultaneously. And, preferred embodiments may be adapted to replicate a plurality of source files 106. When embodiments employ replication of multiple source files, the order of data writes within a single file is maintained, and the order of data writes across files is maintained. As a result, preferred embodiments can be used to accurately replicate data using substantially any type of computer, network, or file system architecture.

Client computers 108A-D may consist of any type of processing device capable of executing machine-readable instructions and further capable of communicating with primary server 102. Client computers 108 may include, for example, personal computers, laptop computers, personal digital assistants (PDAs), hand held computers, web-enabled cellular telephones and application specific processing devices such as printer 110. Client computers 108A-D may communicate with primary server 102 using LAN 112. LAN 112 may be a hardwired network, a wireless network, or a combination thereof. Components and systems operatively associated with primary server 102 may collectively be associated with a source location 101 which may be, for example, an office building, a hospital, a university campus, etc.

Source location 101 may furthermore be communicatively coupled to one-or-more remote locations 103 using communications network 114 and one-or-more links 116. Links 116 may consist of hardwired connections capable of conveying data and may include, for example, shielded-twisted pair, coaxial cable, optical fiber, and the like. Alternatively, links 116 may be wireless and can include, for example, radio frequency (RF), free space optical, or free space acoustic communication media.

Communications network 114 is used to convey machine-readable data from a primary server 116 to at least one remote server 118. Communications network 118 may consist of any type of network capable of carrying machine-readable carrier waves and/or data transmissions between a sending device and a receiving device and can include substantially any type of analog or digital network operating with substantially any network protocol. By way of example, network 114 may consist of a telecommunication network such as a plain old telephone system (POTS) or a data communications network such as a local area network (LAN), a wide area network (WAN) or metropolitan network (MAN).

Furthermore, network 114 may operate using substantially any network protocol, alone or in combination, including but not limited to synchronous optical transport (SONET), asynchronous transfer mode (ATM), internet protocol (IP), frame relay, packet switched, real-time transport protocol (RTP), wireless application protocol (WAP), Bluetooth™, and the like.

Remote server, or computer, 118 may be configured using an architecture similar to that used in conjunction with primary server 102; however, remote server 118 is not limited thereto. Remote server 118 may alternatively employ hardware and software that is different in make-up and operational functionality if desired. Remote server 118 is further configured to receive and operate on blocks of data used in conjunction with replicating source file 106 onto remote server 118 in accordance with aspects of preferred embodiments. Remote data store 120 may be configured in substantially the same manner as data store 104 and is used to facilitate storage of replicated file 122, also referred to as file-remote. Replicated file 122 contains a true copy of data making up source file 106. In addition, replicated file 122 may be updated in a substantially continuous manner using bandwidth efficient data mirroring techniques described hereinbelow.

Replacement primary file server 124 includes necessary hardware and application software for enabling it to function in substantially the same capacity as primary file server 102 upon receipt of a replicated file 122. For example, if primary server 102 suffers a catastrophic crash, remote server 118 may be programmed to transfer an up-to-date version of replicated files 122 to replacement server 124. Upon receipt of replicated files 122, replacement server 124 can assume the functionality previously performed by primary server 102. Replacement server 124 may be located, for example, in the same building as primary server 102 whereas remote server 118 may be located in a different city. Alternatively, remote server 118 may become a replacement for primary server 102 and replacement server 124 may become the backup server for remote server 118 upon a catastrophic failure of primary server 102.

Software vendor 126 makes necessary machine-executable code available to primary server 102, remote server 118 and replacement server 124 so that these systems can perform real-time data replication. In addition, software provider 126 may provide customer support and may further provide system and software monitoring to customers. In alternative embodiments and implementations, software provider 126 may provide emote server 118 using its facilities and infrastructure so that data replication services can be provided using an application service provider (ASP) model.

Figure 1B:
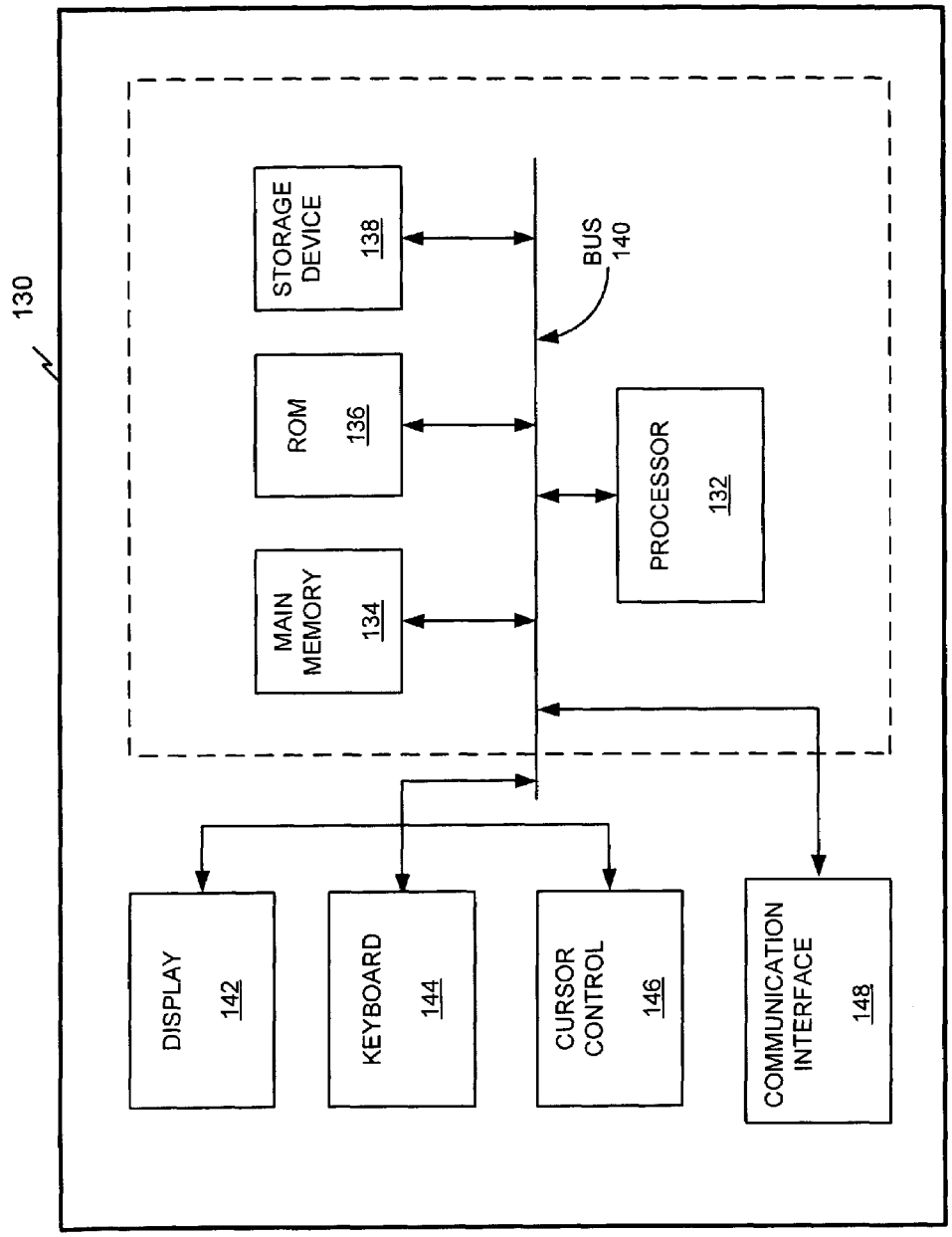
FIG. 1B illustrates an exemplary general-purpose computer architecture for use in implementing aspects and embodiments of the invention.

FIG. 1B illustrates an exemplary embodiment of a general-purpose computer 130 capable of adaptation for use as a primary server 102, a client 108, a remote server 118, a replacement primary server 124 or a software provider 126. The exemplary computer 130 includes a processor 132, main memory 134, read only memory (ROM) 136, storage device 138, bus 140, display 142, keyboard 144, cursor control 146, and communication interface 148.

Processor 132 may be any type of conventional processing device that interprets and executes instructions. Furthermore, processor 132 can be implemented as a single processor or as multiple processors operating in, for example, a parallel configuration. Main memory 134 may be a random access memory (RAM) or a similar dynamic storage device. Main memory 134 stores information and instructions to be executed by processor 132. Main memory 134 may also be used for storing temporary variables or other intermediate information during execution of instructions by processor 132. ROM 136 stores static information and instructions for processor 132. It will be appreciated that ROM 136 may be replaced with some other type of static storage device. Data storage device 138 may include any type of magnetic or optical media and its corresponding interfaces and operational hardware. Data storage device 138 stores information and instructions for use by processor 132. Bus 140 includes a set of hardware lines (conductors, optical fibers, or the like) that allow for data transfer among the components of computer 130.

Display device 142 may be a cathode ray tube (CRT), or the like, for displaying information to a user. Keyboard 144 and cursor control 146 allow a user to interact with computer 130. Cursor control 146 may be, for example, a mouse. In an alternative configuration, keyboard 144 and cursor control 146 can be replaced with a microphone and voice recognition means to enable the user to interact with computer 130.

Communication interface 148 enables computer 130 to communicate with other devices/systems via any communications medium. For example, communication interface 148 may be a modem, an Ethernet interface to a LAN, or a printer interface. Alternatively, communication interface 148 can be any other interface that enables communication between computer 130 and other devices or systems.

By way of example, a computer 130 consistent with the present invention provides a system capable of replicating data from a source computer 102 to a remote computer 118 over a network 114. Computer 130 performs operations necessary to complete desired actions in response to processor 132 executing sequences of instructions contained in, for example, memory 134. Such instructions may be read into memory 134 from another computer-readable medium, such as a data storage device 138, or from a remote device via communication interface 148. Execution of the sequences of instructions contained in memory 134 causes processor 132 to perform a method for replicating data across a network. For example, processor 132 may execute instructions to perform the functions of identifying data for replication, formatting replicated data for transmission to a remote computer and for making formatted data available to a network. Alternatively, hard-wired circuitry may be used in place of or in combination with software instructions to implement the present invention. Thus, the present invention is not limited to any specific combination of hardware circuitry and software. Furthermore, computer 130 may be implemented in a centralized or distributed manner wherein components are interconnected using, for example, network connections. In addition, computer 130 can be an application specific computer having customized processors, interfaces, and the like.

Exemplary Top Level Method

Figure 2A:
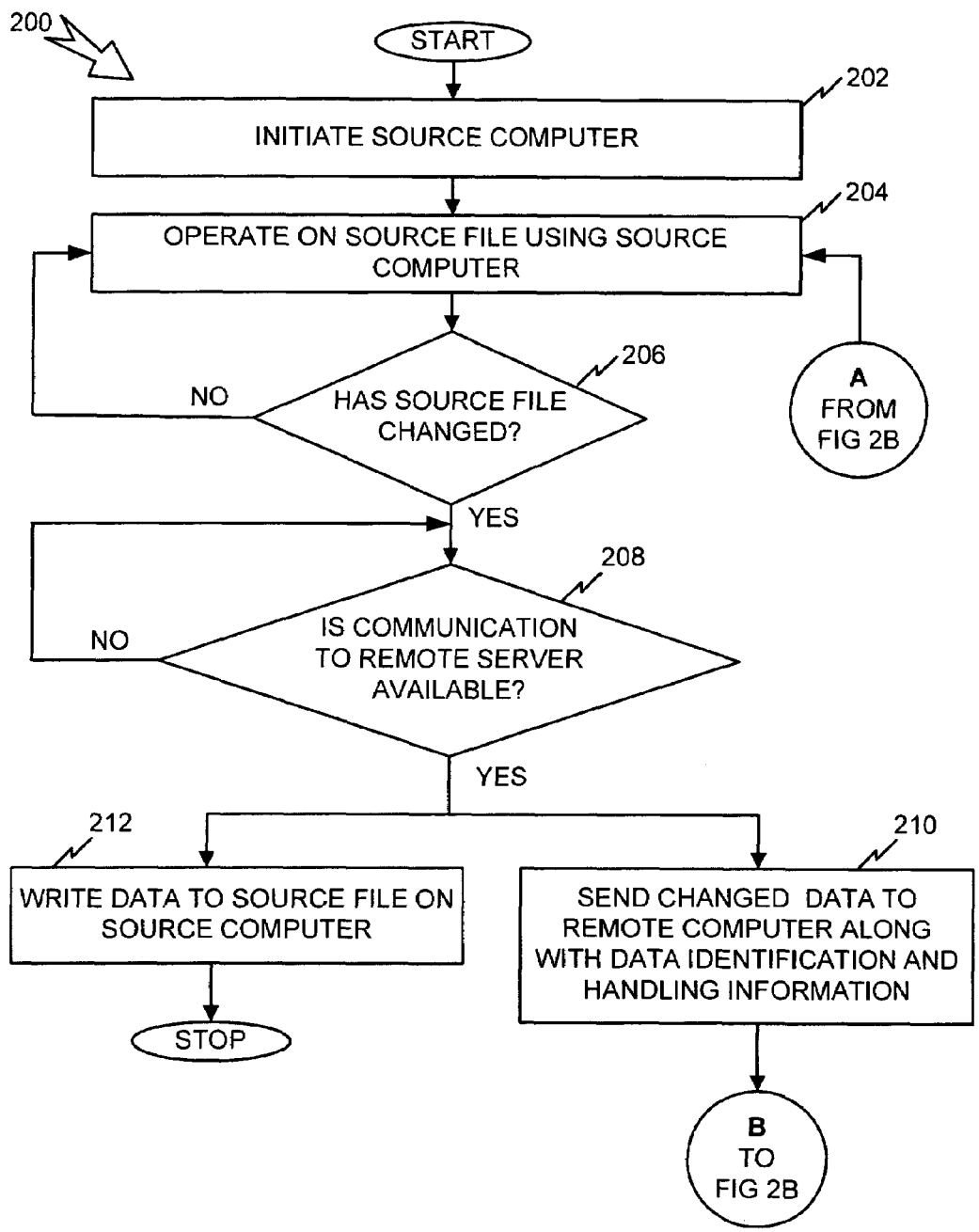
FIGS. 2A and 2B illustrate an exemplary method for performing data replication in accordance with an aspect of the invention.
Figure 2B:
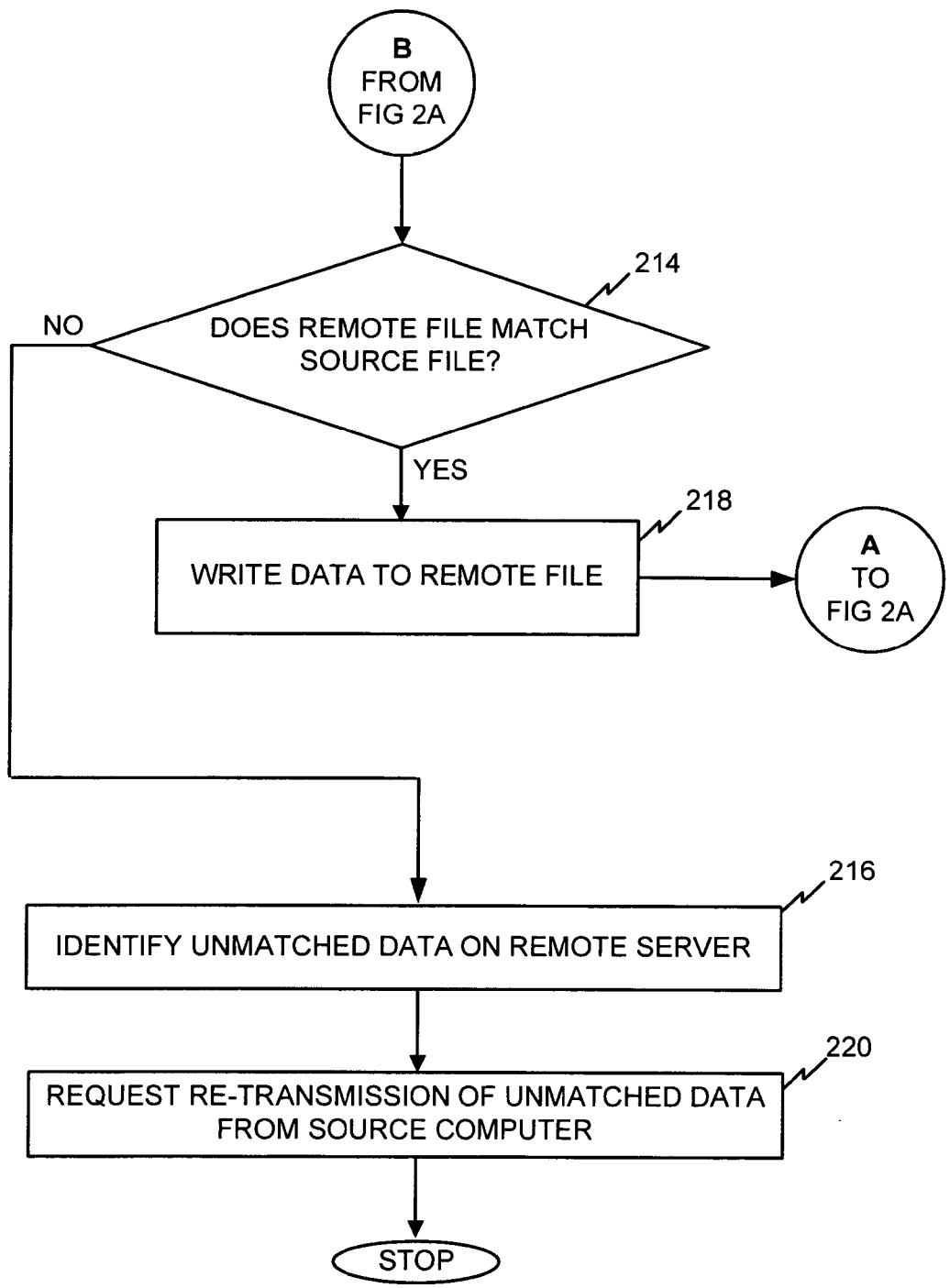

FIGS. 2A and 2B illustrate a top level method 200 that can be practiced using system 100. Method 200, as well as other methods described herein, may be implemented in conjunction with virtually any type of host application generating and manipulating essentially any type of file containing substantially any type of data. Method 200 may commence when primary server 102 is powered up, or otherwise initiated (step 202). Primary server 102 then operates on a source file 106, also referred to as file-master (step 204). A determination is then made to identify changes in source file 106 (step 206). If no changes were made, the method loops back to step 204; however, if changes were made to source file 106, step 208 is executed. The method determines if communication to remote server 118 is available (step 208). If data communication is available, data is written to a source file on source server 102 (step 212). In addition, source file data that has changed is sent asynchronously to remote server 118 along with data identification and handling information (step 210). Data handling and identification information is used to label blocks of data so they can be properly ordered and associated into replicated file, also referred to as file-remote, 122 to produce a true copy of source file 106.

In step 214 (FIG. 2B), a check is made to determine if replicated file 122 matches source file 106. If the two files match, the method flow loops back to step 204 after writing data to a remote file (step 218). In contrast, if the files do not match, unmatched data is identified on remote server 118 (step 216). Remote server 118 then requests that the unmatched data be re-transmitted from primary server 102 (step 220).

Exemplary Method for Mirroring Data

Figure 3A:
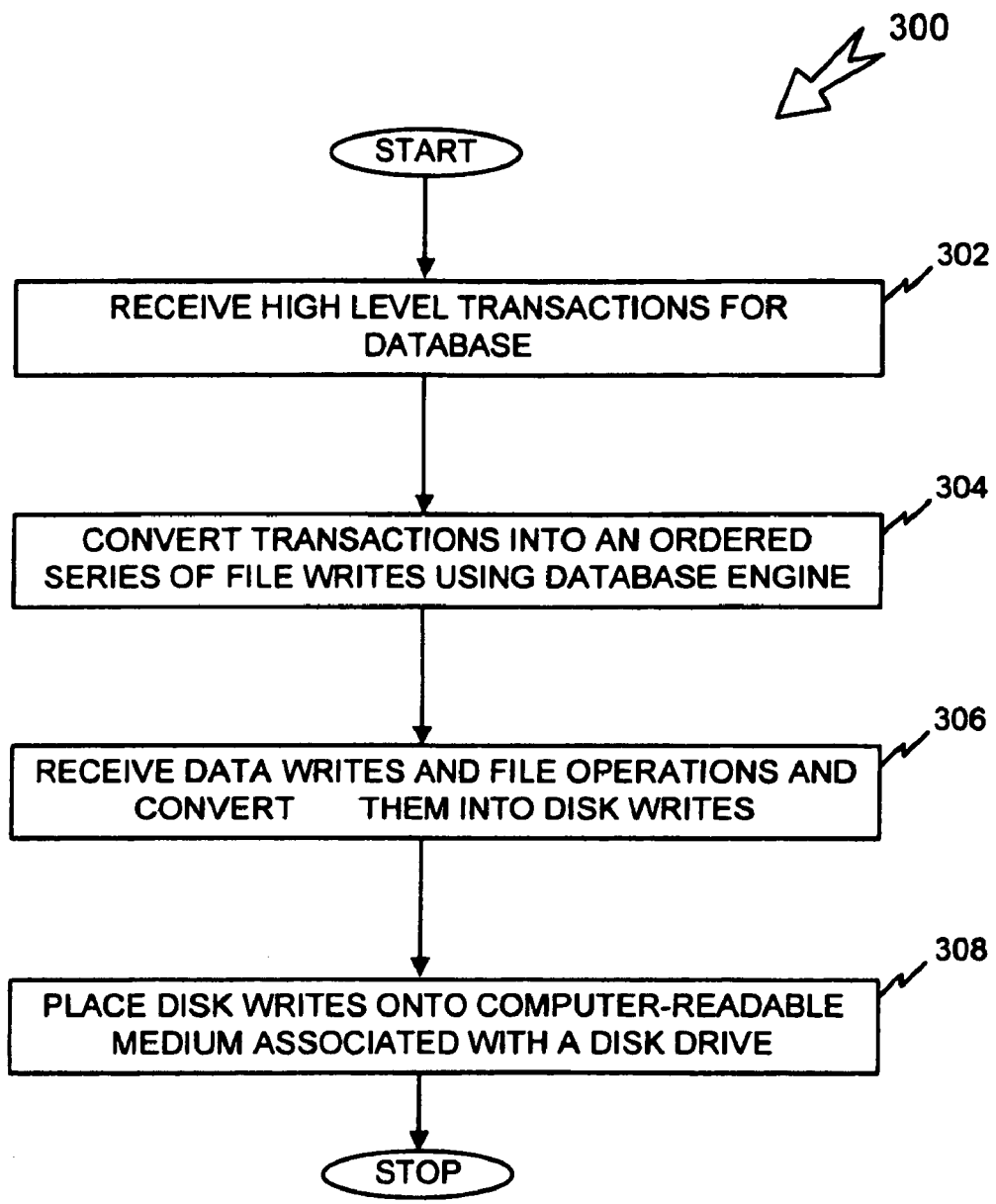
FIG. 3A illustrates an exemplary method for implementing a database application on a primary server in accordance with an embodiment of the invention.

FIG. 3A illustrates an exemplary method 300 utilized in conjunction with a host application. In conjunction with FIG. 3A, a database application is used as an exemplary representation of a host application; however, FIG. 3A and other methods used herein are not limited to use with only database applications. High level transactions are provided to a database engine (step 302). High level transactions may include, among other things, creation of new database. records such as data associated with an employee, a financial transaction, a schedule, or an asset tracking system. These high level transactions are processed by the database engine where they are converted into an ordered series of file writes (step 304). A file system receives the file writes and converts them into a series of disk writes (step 306). The disk writes are then written to particular sectors of a computer-readable storage medium such as, for example, a hard disk (step 308).

Figure 3B:
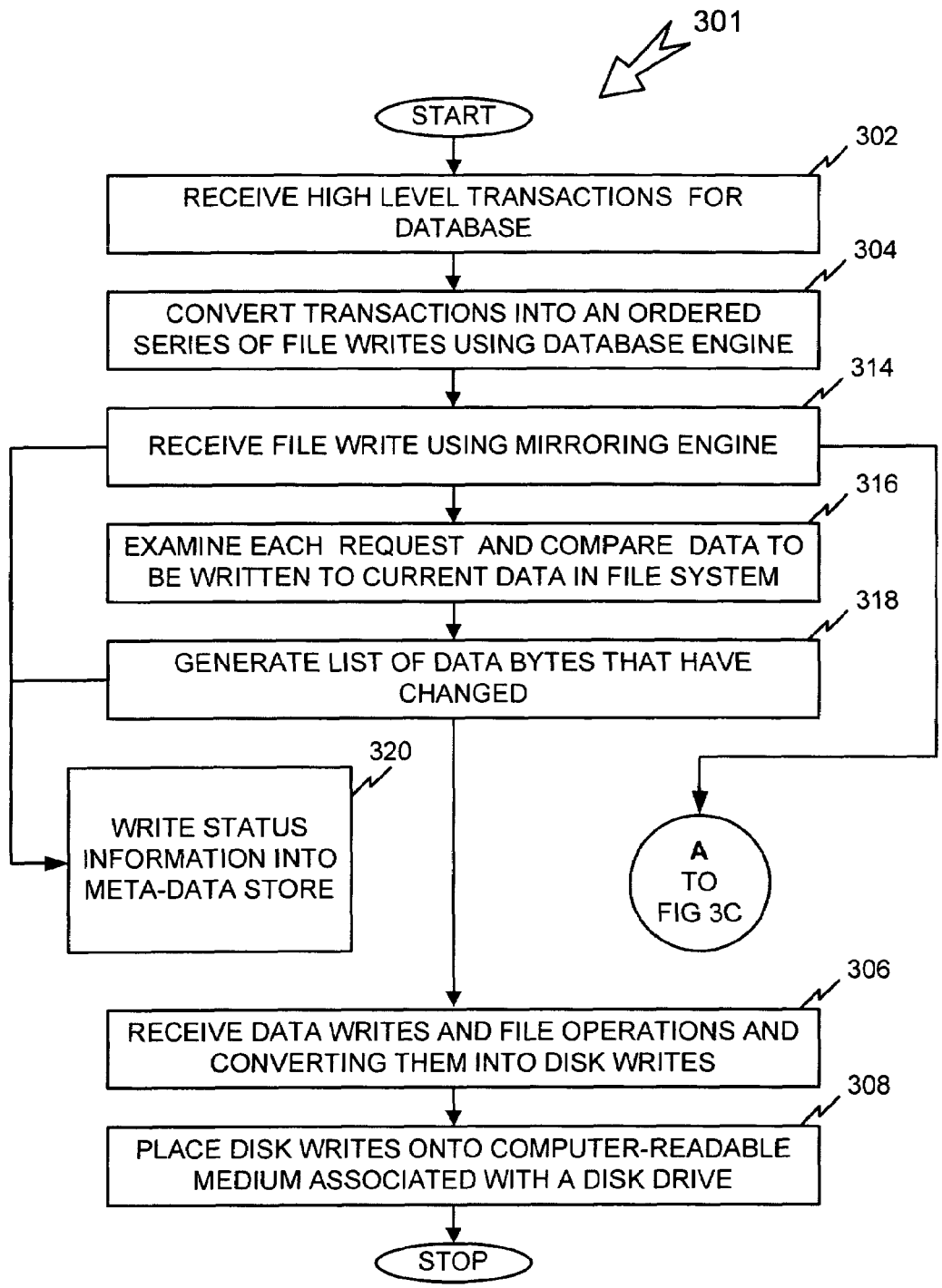
FIGS. 3B and 3C illustrate an exemplary method for implementing a database application in conjunction with an embodiment of a data mirroring engine in accordance with an embodiment of the invention.
Figure 3C:
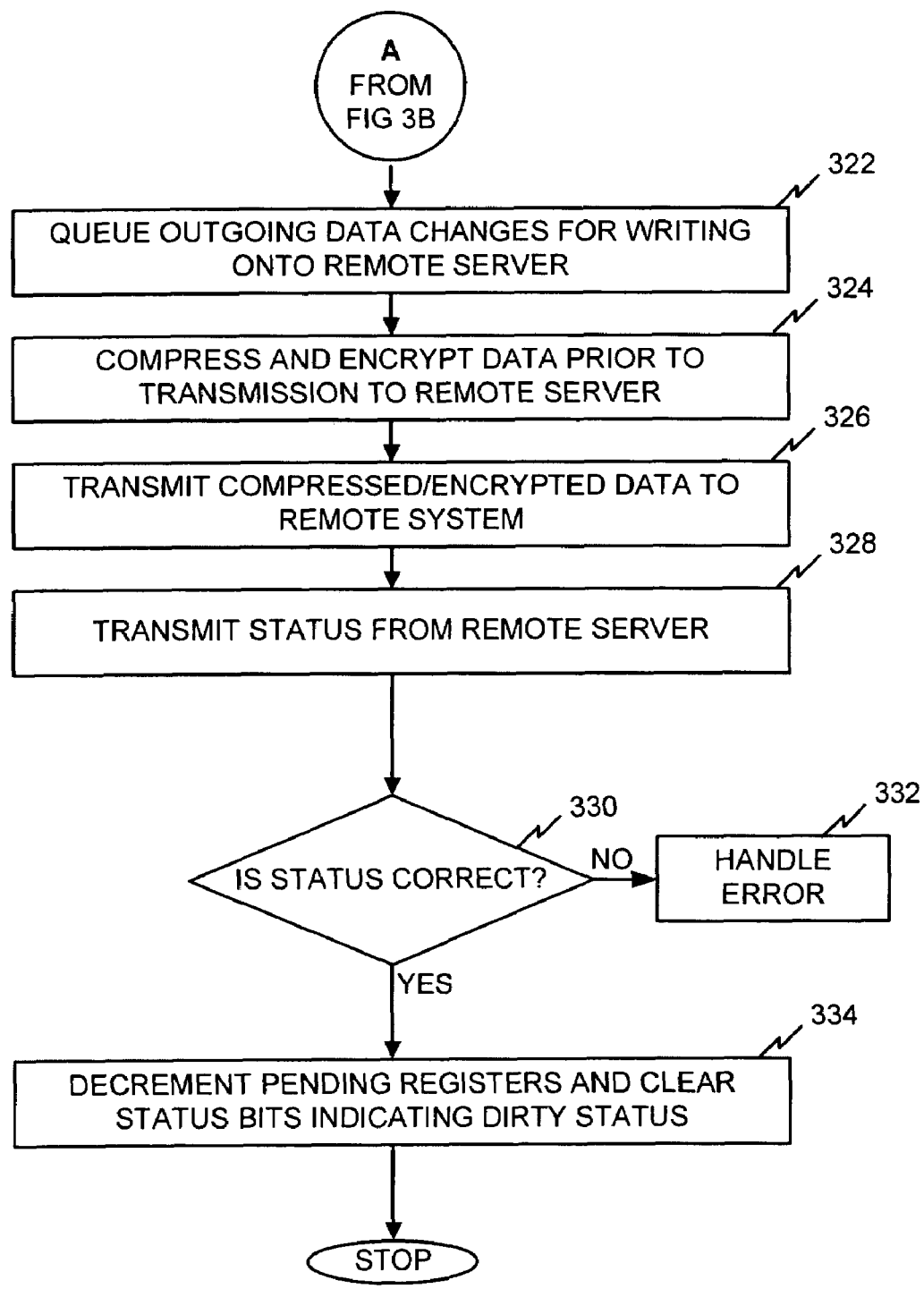

FIGS. 3B and 3C illustrate method 300 as enhanced through the use of a mirroring engine for facilitating accurate and efficient replication of data from a primary server 102 to a remote server 118. The enhanced method of FIGS. 3B and 3C is generally denoted as method 301.

Method 301 commences with receipt of high level transactions (step 302) and conversion into an ordered series of file writes having a format of (address, data) where address identifies the location where the data value will be written onto a computer-readable medium and data refers to the information written to that address (step 304). The ordered series of file writes is provided to a mirroring engine (step 314). The mirroring engine is implemented in software or by way of a hardware/software combination. The mirroring engine operates to coordinate disk writes on source server 102 and data replication to remote server 118 using network 114. The mirroring engine writes status information into a meta-data store (step 320). The meta-data store is a computer-readable data structure for receiving and manipulating data and information used in the replication process. Each request is then examined by comparing the data to be written to a particular file location with data currently residing at that particular location in the file system of primary server 102 (step 316). This comparison produces a list of data bytes that have changed. And, the list is provided to the meta-data store (step 318). The meta-data store operates to capture specific data bytes that have not yet been mirrored or written to the primary, or master, file. The mirroring engine of step 314 then makes the data available so that file operations and data writes are received and converted to disk writes (step 306) which are then placed onto a computer-readable medium associated with, for example, a disk drive (step 308).

The mirroring engine operates on blocks of data rather than on an entire data file when processing write requests. By operating on blocks, the mirroring engine performs comparison operations using smaller data increments, which increases the operating speed and efficiency of the system. Block comparisons are performed before and after a write operation to ensure the accuracy of written and replicated data.

The mirroring engine of step 314 also queues outgoing data changes for subsequent transmission to remote server 118 (step 322). Embodiments queue data concurrently with step 314 if communication is established between primary server 102 and remote server 118. After queuing, data changes are compressed and encrypted using known techniques in the art (step 324). The compressed/encrypted data is then asynchronously transferred from primary server 102 to remote server 118 using as few packets as possible (step 326). Preferred embodiments group as many write requests as possible into a single packet to facilitate efficient use of network bandwidth. This grouping of packets in conjunction with block level processing facilitates efficient bandwidth usage because compression algorithms are more efficient when operating on larger pieces of data. Remote server 118 periodically, or on demand, transmits status messages to primary server 102 to facilitate efficient synchronization of data between primary server 102 and remote server 118 (step 328).

Primary server 102 then determines if the status information is correct (step 330). If status information is not correct, the error is handled (step 332). In contrast, if the status received from remote server 118 is valid, pending registers associated with the outgoing queue are decremented and dirty status indicators, or bits, are cleared (step 334).

When remote server 118 receives the incoming packet, the packet is decrypted and decompressed. Then, the received packet is processed and each of the write requests is handled in the appropriate order. Processing by remote server 118 also involves verifying that the write is legal. A legal write is one where the rest of the bytes in the file, which are not written by the write request, are identical to the corresponding bytes in the file on the primary server 102 at the time the write request is being processed. If this condition is met, the data is written to the master file's replica resident on remote server 118. After writing, status information is sent back to the mirroring engine via network 114.

Embodiments of remote server 118 quickly determine if the rest of the file, namely the entire file minus the locations that are to be modified, are identical on both the primary server 102 and remote server 118 prior to writing transmitted data onto storage media associated with remote server 118. This process ensures that the sequence of writes is the same on both primary server 102 and remote server 118. In particular, embodiments ensure that the order of writes is maintained and that no write request is dropped. By ensuring that source file 106 is identical to remote file 122 prior to performing any new writes to remote file 122, preferred embodiments facilitate prompt detection and remediation of errors by eliminating the possibility that mismatched data on remote server 118 will go undetected during subsequent write operations.

In situations where the communications link between primary server 102 and remote server 118 is not available, the mirroring engine does not enter the write requests into the queue. Instead, the mirroring engine marks the blocks in which the write happened as dirty. A marking of dirty identifies that the block needs to be sent to the remote server 118 when the communication link is operating properly.

Exemplary Data Structures for Use in File Replication

The use of a meta-data file for tracking information associated with data being replicated from a primary server 102 to a remote server 118 makes possible very efficient communication. Embodiments of the invention may utilize one meta-data file per replicated file; however, alternative configurations can also be used.

Figure 4A:
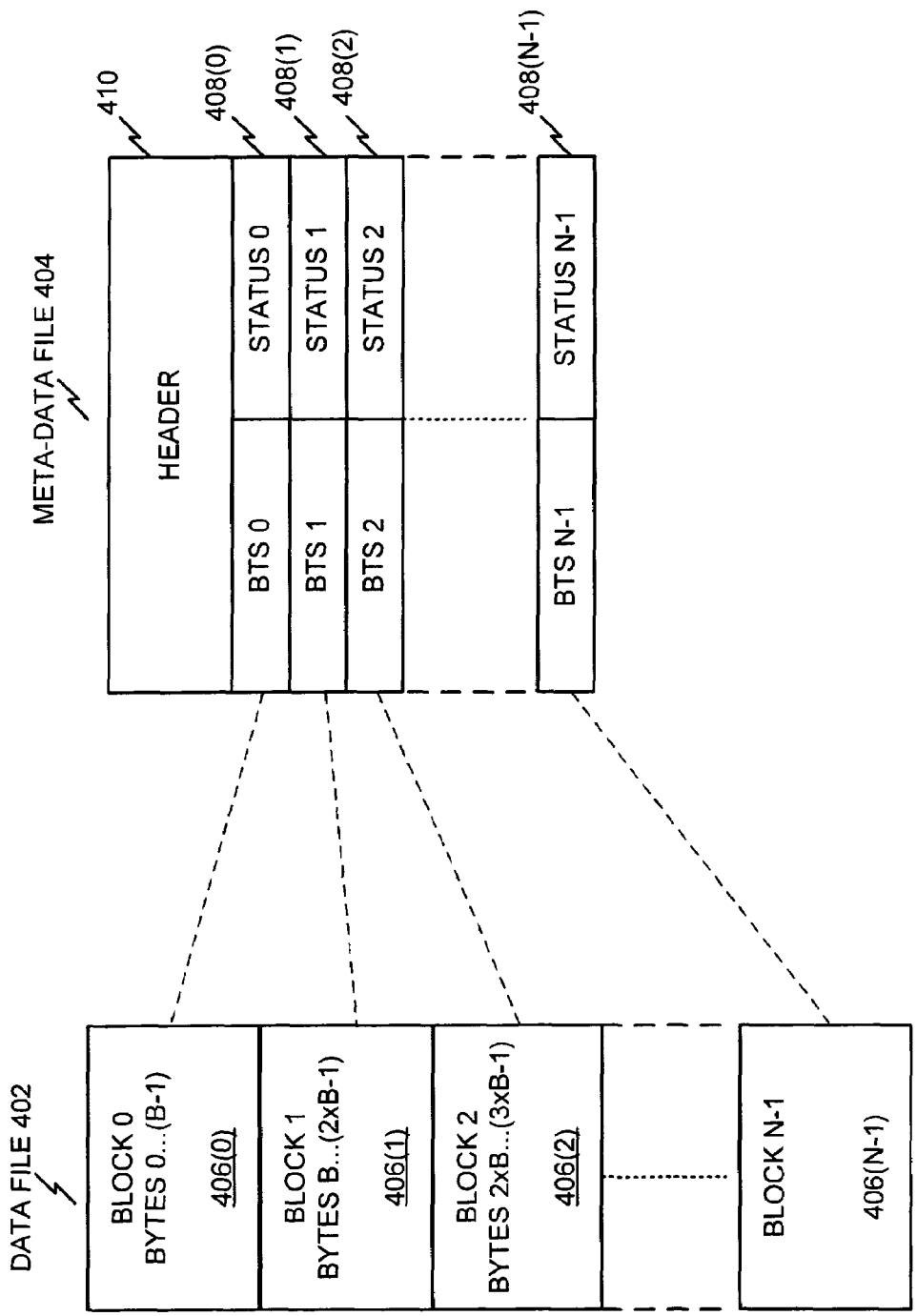
FIG. 4A illustrates an exemplary technique for storing, manipulating, and mapping computer-readable data structures, such as data blocks associated with a data file, to a meta-data file in accordance with an embodiment of the invention.

FIG. 4A illustrates an exemplary schematic of a data file 402 mapped to a meta-data file 404. As illustrated in FIG. 4A, data file 402 is divided into n blocks 406(*o*)-406(n−1) each having a determined length B, except for the last block which might be shorter. In a preferred embodiment, B is 16,384 bytes in length. By way of example, if a file has 32,868 data bytes, then a preferred embodiment divides it into three blocks, the first two being 16,384 bytes each, and the last being 100 bytes. Each block 406 is in turn mapped to a location associated with meta-data file 404. For example, block 406 (0) may be mapped to field 408 (0) having BTS (0) and status 0 associated therewith. Meta-data file 404 may further include header 410 for facilitating handling by remote server 118 and/or network 114.

For each corresponding data block two small pieces of information are stored, namely a block temporal signature (BTS) and a plurality of status bits collectively referred to as a status byte. For example, an implementation of a preferred embodiment may utilize a BTS having a length of seven bytes and a status byte having a length of one byte. The meta-data file may also include a header 410, referred to as meta-header, which can be used for, among other things, assisting with crash recovery. By way of example, a meta-data file may be on the order of 2048 times smaller than the source data file that it represents.

Figure 4B:
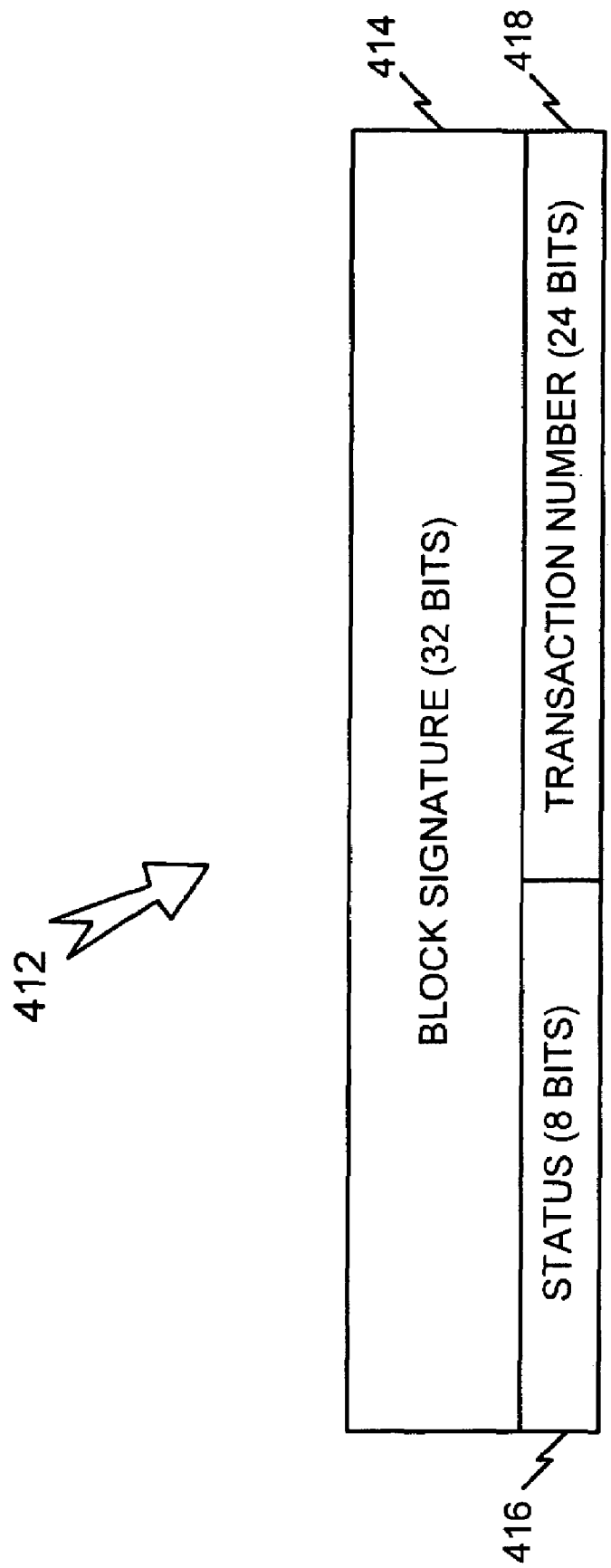
FIG. 4B illustrates an exemplary computer-readable data structure for a block temporal signature as used in conjunction with a meta-data file in accordance with an aspect of the invention.

FIG. 4B illustrates an exemplary BTS 412 in greater detail. BTS 412 may include, among other things, block signature 414, status byte 416, and transaction number 418.

Block signature 414 acts as a data signature having a determined length and uniquely representing the data bits making up a block B. In a preferred embodiment, block signature 414 is 32 bits in length; however, other lengths can be used if desired. Block signature 414 is further produced using a hash function. A hash function is a transformation that takes an input and returns a fixed size string, which is referred to as the hash value. The hash function is designed such that the hash value represents concisely the longer message, data block, or file from which it was computed. The output of a hash function when run against an input is referred to as a message digest and acts as a digital fingerprint of the larger input against which the hash function was run. Here, block signature 414 is a message digest of the original data block against which the hash function was applied. Preferred embodiments employ a cyclic redundancy check (CRC) function to produce a CRC signature; however, other types of hash functions known in the art can be employed if desired.

Embodiments employing CRC functions, as well as other types of hash functions known in the art, facilitate efficient operation by operating only on changed bytes within a data block. If a hash function is run against an entire block, the processing time may be proportional to the amount of data in the block. Embodiments employ techniques which make processing time a function of only those bytes which have changed within a given data block. In particular, embodiments employ cumulative and absolute signatures for facilitating efficient system operation. Hash functions are also used in conjunction with transaction numbers to eliminate the chances of hash collisions causing errors in the data replication process. A hash collision occurs when the same message digest is produced when a hash function is run against two unequal input data blocks. The transaction number is assigned only by the remote computer 118 and is further incremented in a manner causing each data block to be uniquely and unmistakably identified. This unique identification allows a data block to be correctly written onto remote computer 118 regardless of when it is received, provided the data in the block is not corrupted.

Status byte 416 may be a determined length and may include, for example, 8 bits with each bit being uniquely associated with a particular parameter. By way of example, one of the 8 bits may be referred to as a dirty bit and may be used on primary server 102 to indicate that a block in data file 402 was written into but that the information has not yet been transferred to remote server 118. In addition, a status bit may be used to indicate whether block signature 414 is absolute or cumulative. An absolute signature may be obtained by applying the hash function, for example CRC, to an entire data block 406. In contrast, a cumulative signature refers to situations where the signature is computed against only a portion of block 406, namely, only that portion of the block containing changed data. For example, if only a single byte is written into a data block the signature of the block must be recomputed.

Computing the signature against an entire block may inefficiently utilize CPU resources especially if computations must be run against numerous blocks. For cumulative signatures, the signature is computed only for the changed bytes together with the current BTS which includes the previous block signature and the transaction number. The use of cumulative signatures facilitates efficient use of CPU resources on both primary server 102 and remote server 118 as well as helping to minimize the network bandwidth required for transferring replication data. A status bit can also be used as a file-open status indicator if desired.

Meta-header 410 may be used for conveying status information about source files operated on using preferred embodiments. For example, meta-header 410 can include a file open status indicator consisting of, for example, a fixed length constant of say 32-bits. In particular, when meta-data file 404 is opened, this constant can be written into the file thus indicating that the file is open. Then, when meta-data file 404 is properly closed, another fixed length constant is written into the file where the second constant denotes a properly closed meta-data file 404. When the meta-data file 404 is again opened, and before the constant is overwritten, the indicator is checked. If the 32-bit, fixed length, constant denotes a closed file then it may be assumed that the meta-data file 404 was previously closed in a proper manner and is therefore assumed to be a valid meta-data file. In contrast, if the 32-bit constant denotes an open meta-data file when examined, it indicates that the meta-data file 404 was improperly closed. If the 32-bit constant is any value other than an open or closed value it indicates that the constant is corrupted and therefore is invalid.

Meta-header 410 may further contain the last transaction number written into the last BTS that was updated. In addition, meta-header 410 can include the time and date on which the file was last written. This time and date information can further be used as a second validation mechanism if the open-indicator is found to be legitimate. Meta-header may further include other information such as information identifying the version of a host application that is generating write operations.

Preferred embodiments uniquely label blocks of data using transaction numbers. Transaction numbers in essence provide a unique version number to each block of data. This version number allows system 100 to determine if a given data block represents an earlier version or a later version of a particular data segment. As a result, data blocks can be properly ordered for writing onto a storage device. In addition, version numbers facilitate efficient error correction because a receiving computer can request re-transmission of a data block having a particular version number. Furthermore, the use of a transaction, or version, number provides a redundant confirmation in addition to using the signatures of respective data blocks when they are compared. Allowing only a single computer to assign transaction numbers ensures that transaction number conflicts are avoided. When transaction numbers are evaluated prior to performing data writes, erroneous data writing operations are avoided. Embodiments assign transaction numbers using remote server 118; however, alternative implementations may employ transaction numbers assigned by other devices coupled to network 114.

Figure 4C:
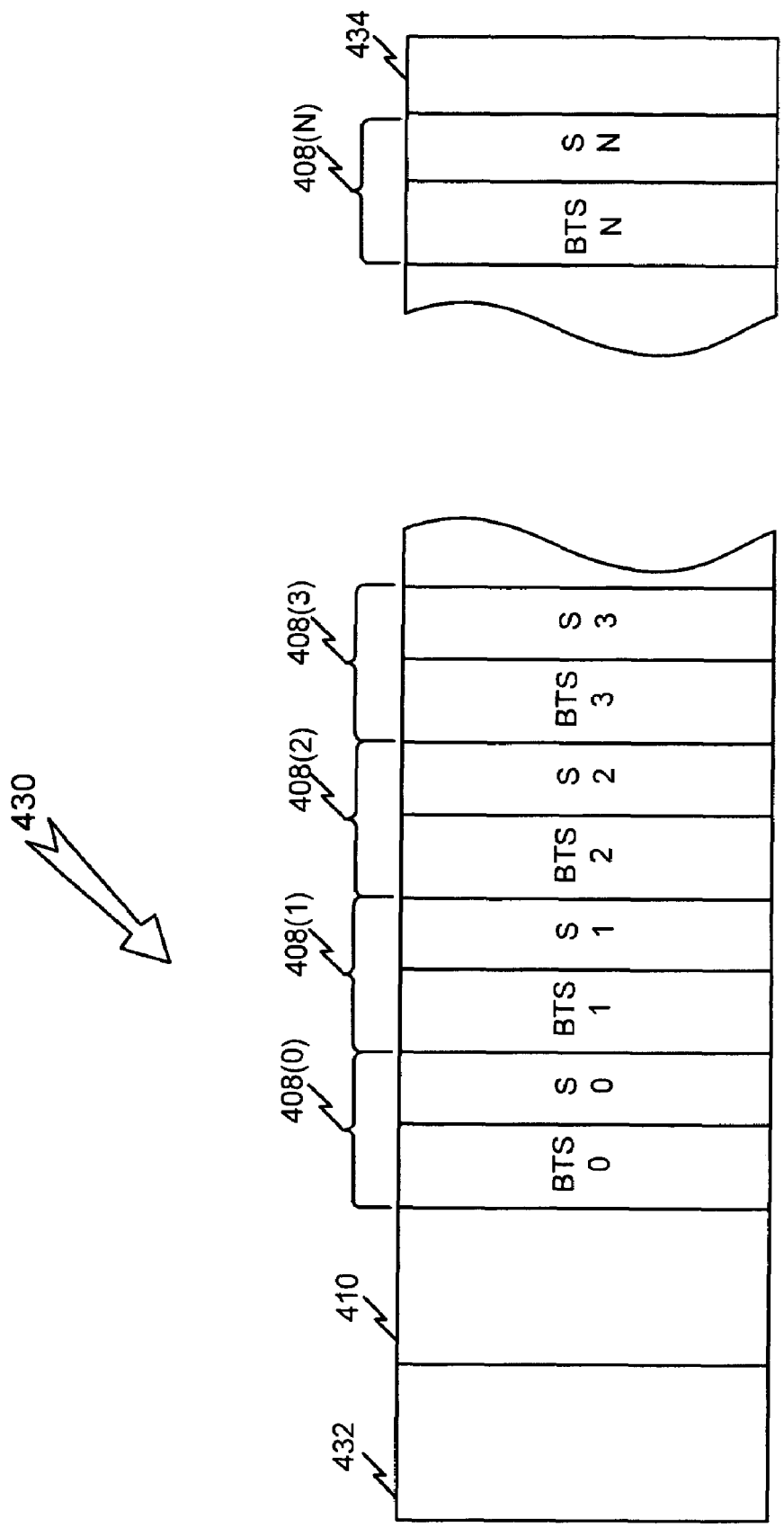
FIG. 4C illustrates an exemplary embodiment of a computer-readable data transmission useful for replicating data from a source computer to a remote computer using a communications network.

FIG. 4C illustrates an exemplary embodiment of a computer-readable data transmission 430 that can be used for conveying replicated data from a source computer. 102 to a remote computer 118 using a communications network 114. Data transmission 430 may take many forms, and in most implementations involving digital communications networks, data transmission 430 will be a machine-readable packet. Packet 430 may vary in size and format based on parameters such as network protocols, network interfaces, network bandwidth, and the like.

Packet 430 may include a packet header 432, meta-header 410, fields 408(0) to 408(n), and tail 434. Header 432 may contain information used to route packet 430 across network 114 such as, for example, a destination address associated with remote computer 118. In addition, header 432 may include information about links 116 traversed by packet 430 as it passes from source computer 102 to a destination, and header 432 may include error detection and/or correction information. Meta-header 410 and fields 408(0)-(n) are as described in conjunction with FIGS. 4A and 4B. Packet 430 may also include additional data such as, for example, data associated with an entire block. And, packet 430 can also include a tail 434. Tail 434 can be used to denote the end of packet 430 and may include information about the size of packet 430, the start of a subsequent packet, error correction information, etc.

Exemplary Methods Operating on a Primary Server

Figure 5A:
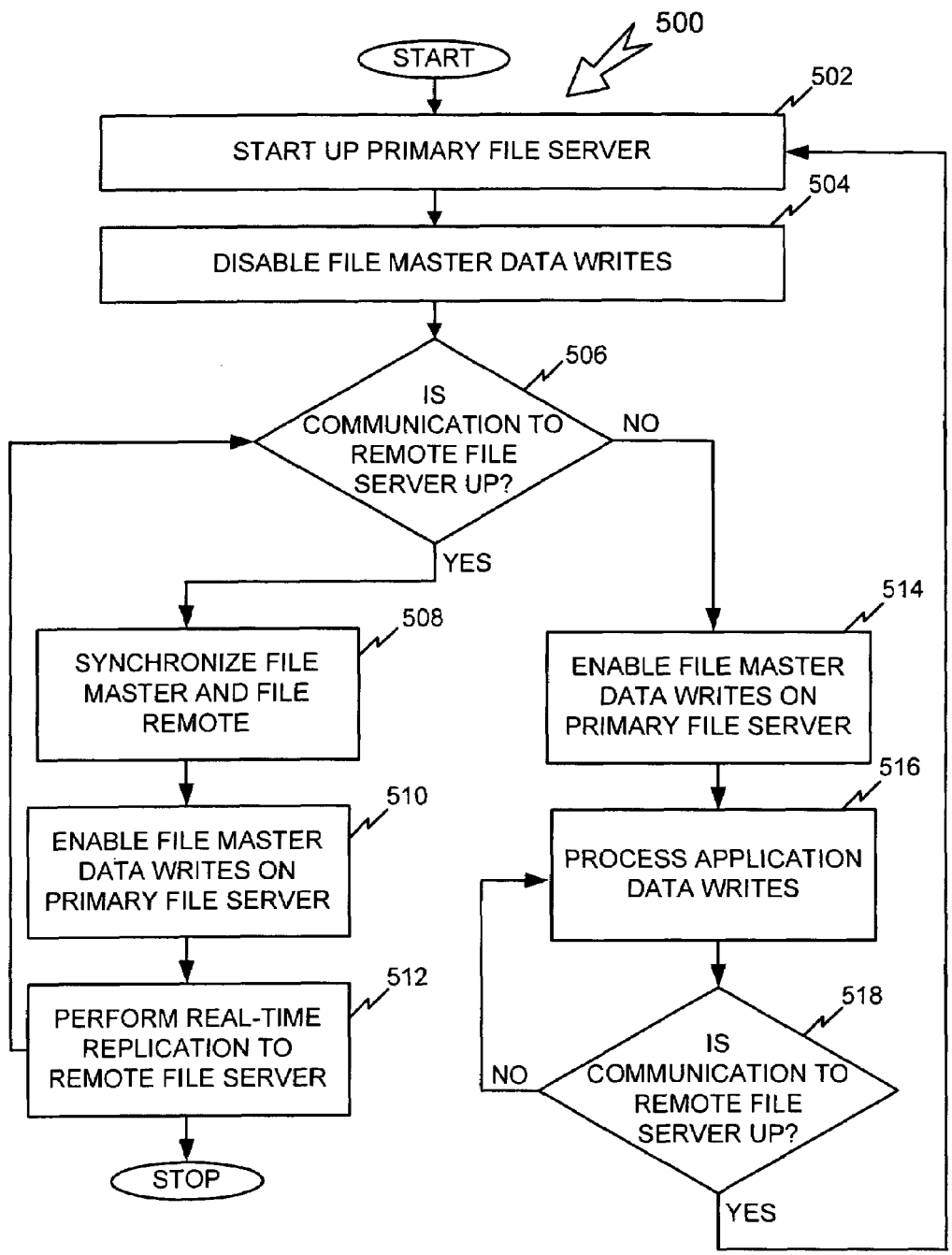
FIGS. 5A-C illustrate an exemplary method for facilitating data replication using a primary file server in accordance with an embodiment of the invention.

FIG. 5A illustrates an exemplary method 500 for operating a primary server 102. The method commences when the primary file server 102 is started (step 502). At startup, file-master data writes are initially disabled (step 504) as the primary file server attempts to establish a reliable communication channel with remote file server 118 (step 506). If reliable communication is established, the file-master and file-remote are synchronized (step 508) and file-master writes are then enabled on the primary server 102 (step 510). Substantially coincident with step 510, real-time replication to remote file server 118 takes place (step 512). After step 512, method flow returns to step 506.

If reliable communication cannot be established at step 506, file-master data writes are enabled on the primary file server 102 (step 514). Application data writes are then processed (step 516) before determining if communication to remote file server 118 has been established (step 518). If communication to remote server 118 has been established, method flow returns to step 502. In contrast, if communication to remote server 118 is not established, method flow returns to step 516.

Figure 5B:
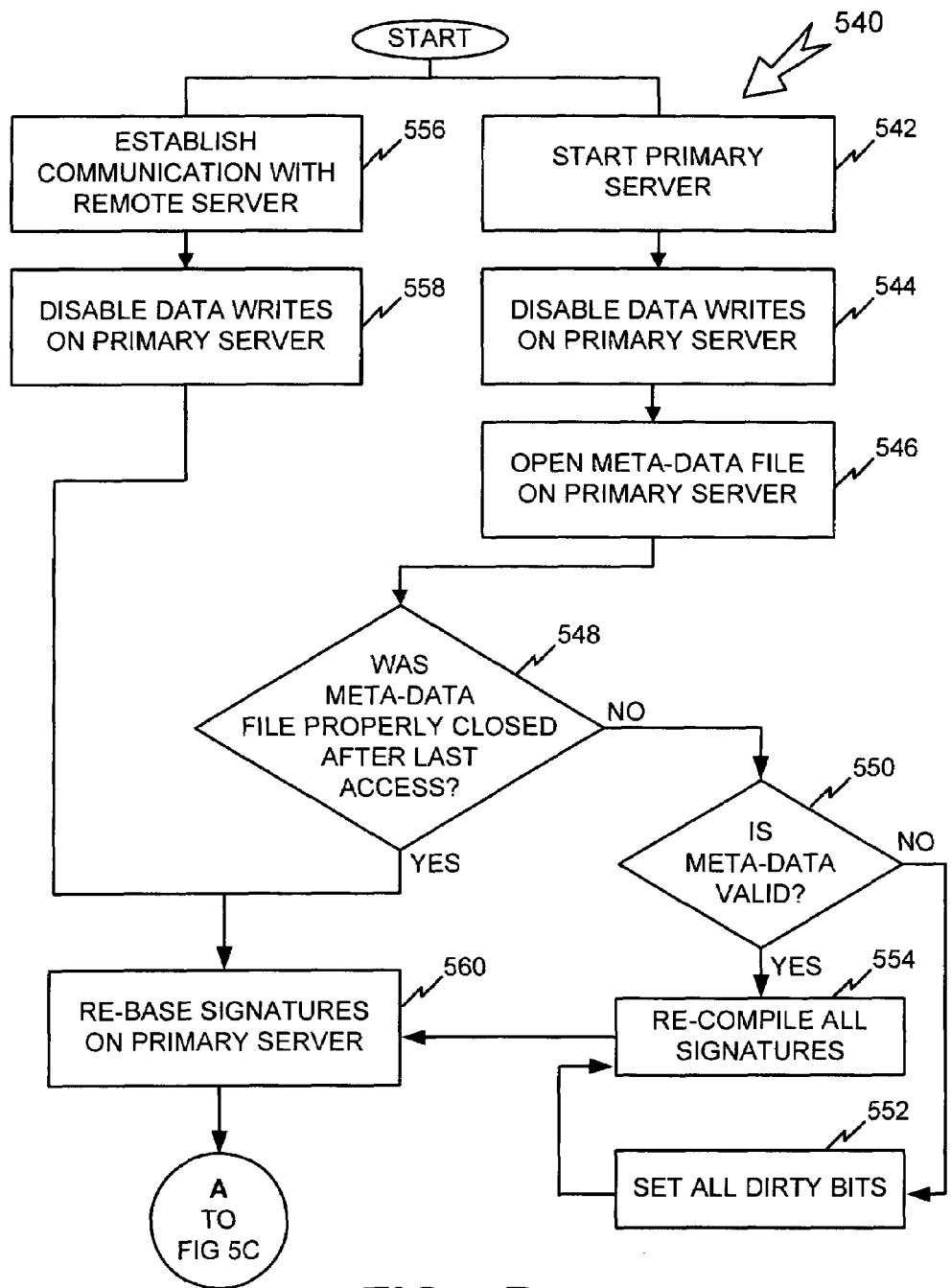
Figure 5C:
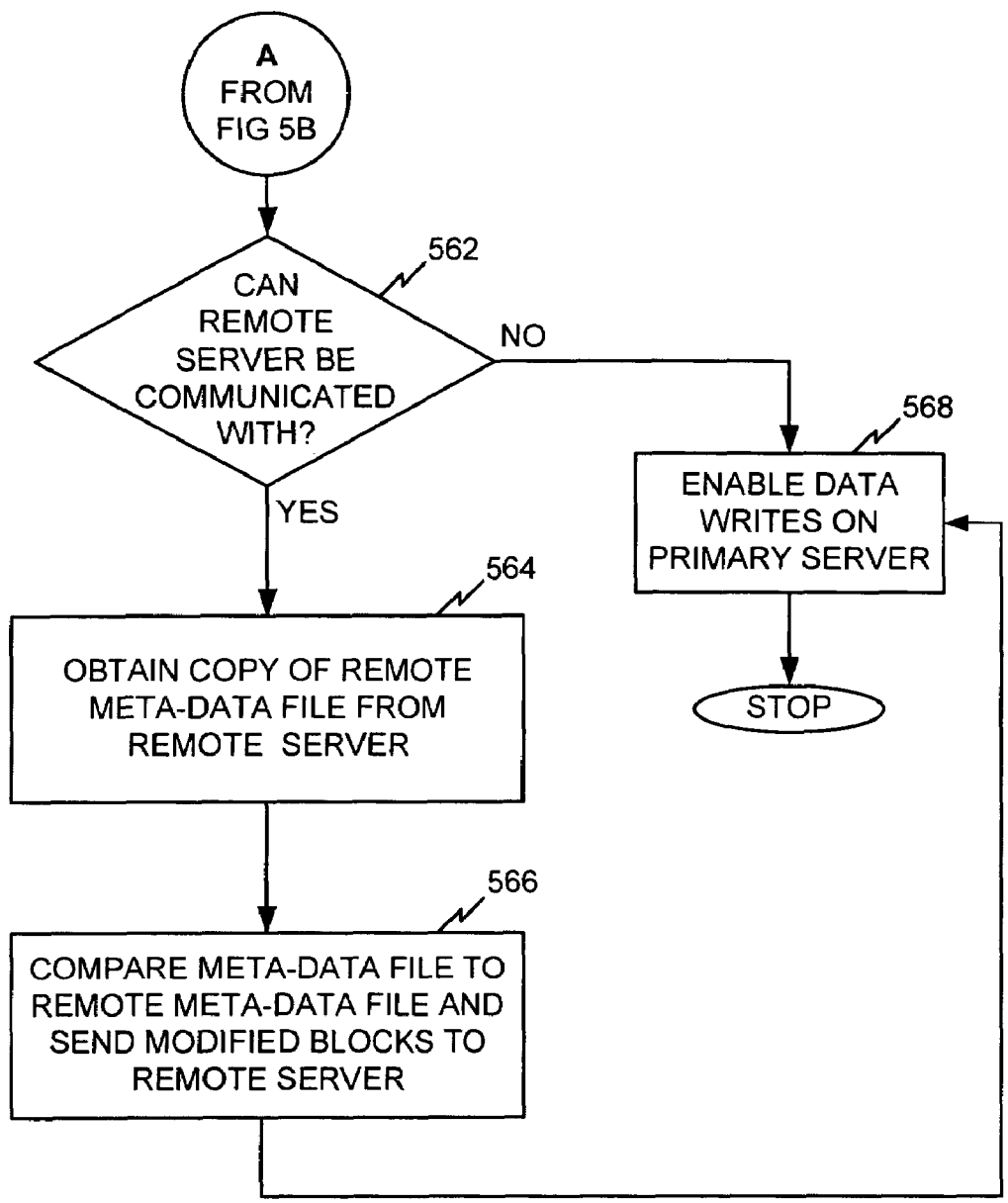

FIGS. 5B and 5C illustrate an exemplary method 540 for ensuring that files on primary file server 102 are equivalent to those on remote file server 118 before commencing data writes on the primary file server 102. Method 540 may commence when primary file server 102 starts up (step 542). At that time, data writes on primary server 102 are disabled (step 544). A meta-data file 404 is opened (step 546). Meta-data file 404 is checked in order to determine if meta-data file 404 was properly closed the last time file replication was stopped (step 548).

If the replication process was not properly stopped, the open status indicator on the meta-data file 404 is checked (step 550). If the open status indicator is valid it may mean that the replication system was not properly closed, and therefore the block signatures may not properly reflect the signature of the actual blocks in the data file. As a result, all block signatures are recomputed (step 554). In contrast, if the open status indicator is not valid, the BTS array is rebuilt and the dirty bit on each BTS is set (step 552). After step 552 all signatures are recomputed (step 554). If meta-data file 404 was properly closed at step 548, and after step 554, method flow continues to step 560 where the signatures are re-based.

Method 540 can also begin with an alternate data flow commencing with step 556 where communication with the remote file server is established. Data writes are then disabled (step 558) before rebasing signatures at step 560. At step 560, the two method flows converge and flow to step 562 where a determination is made regarding communication with remote file server 118. If communication can be established with remote file server 118, a copy of meta-data file 404 is retrieved from remote file server 118 (step 564). The meta-data in the file received from remote file server 118 is compared to the meta-data resident on the primary server 102 (step 566). Data writes are then enabled (step 568). Data writes are further enabled if communication cannot be established with remote file server 118 in step 562.

Exemplary Method for Determining File Equivalence

Figure 6A:
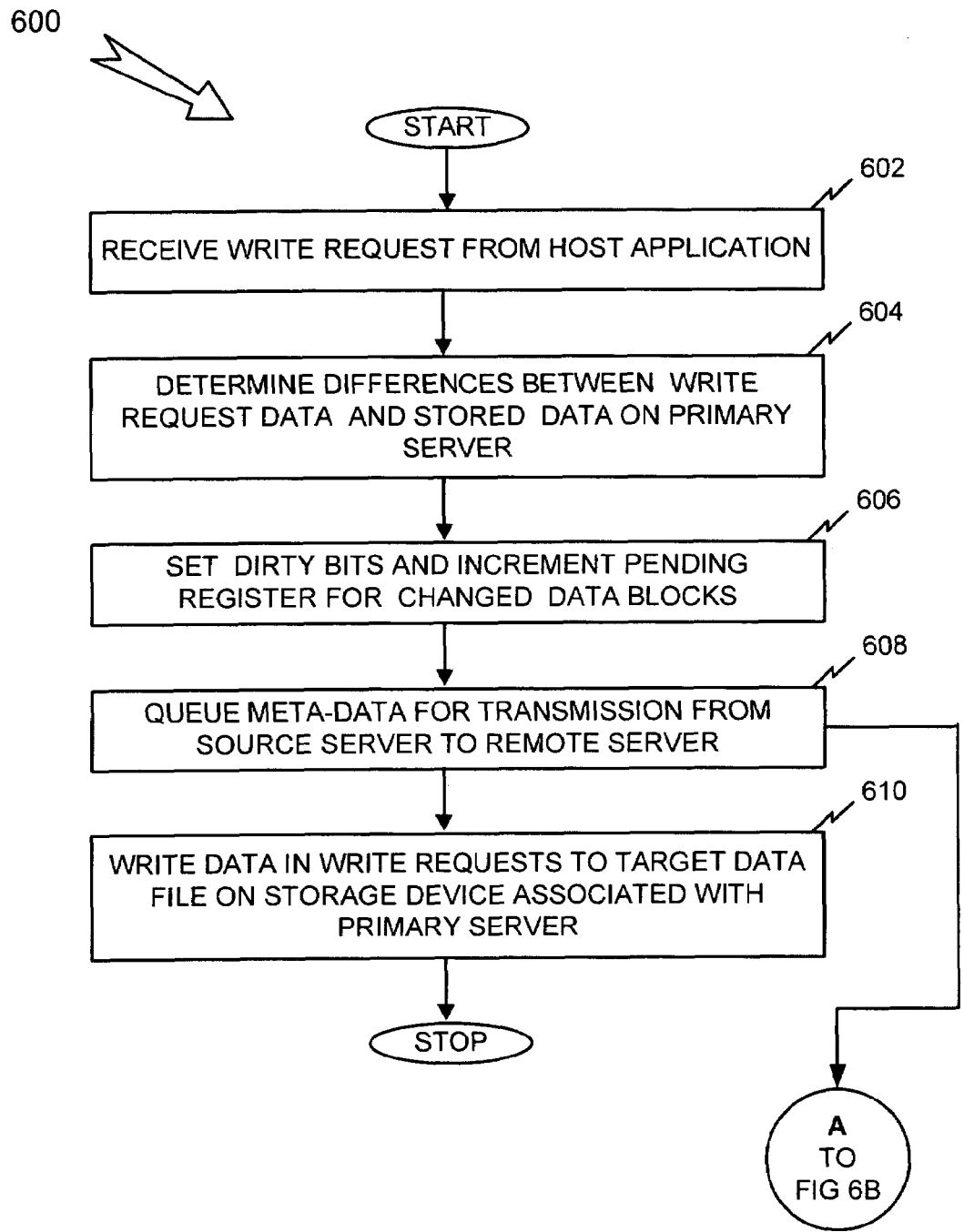
FIGS. 6A and 6B illustrate an exemplary method for facilitating file write requests used in conjunction with a primary file server in accordance with an embodiment of the invention.

FIG. 6A illustrates an exemplary method for determining file equivalence that can be practiced in conjunction with a host application, such as a database application, running on primary file server 102. Method 600 begins when a file write request is received from the application (step 602). The write request typically consists of a series having a format such as, for example, (address$_1$, data$_1$), (address$_2$, data$_2$), etc. Alternatively, the write request can also be a request for changing the size of the file, rather than changing data in the file. In the preferred embodiment, this type of operation is denoted by an (address, data) pair such that the address is in fact the new length of the file (which can be smaller or bigger than the existing length), and there are no data bytes attached. In what follows, (address, data) refers to either type of write, namely a data write or new file size setting.

The series of writes is then compared to the current data in the source, or primary, file (step 604). This comparison produces a series of triplets having a format, for example, of (block$_1$, addressb$_1$, datab$_1$). . . , where block denotes a block number, addressb is the address relative to the beginning of that block, and datab is the data to be written to that address location. Step 604 ensures that only data that is different in the new write request as compared to the current file content is transferred to the next step.

By way of illustrative example, a file having a size of one mega-byte and filled with zeros prior to a write is considered.

In addition, an exemplary block size of 16,384 bytes is employed. Furthermore, a write request includes the data 1, 2, 0, 0, 0, 0, 3, 4, 0, 0 starting at location 16,380 in the file. For this example, the result of the comparison of step 604 is ($block_1$=0, $addressb_1$=16,380, $datab_1$=1, 2,) and ($block_2$=1, $addressb_2$=2, $datab_2$,=3, 4).

Returning to FIG. 6A, each of the block's dirty bits are set in meta-data file 404 and a memory based per-BTS counter is incremented (step 606). The dirty bits and counter are initially zeroed and are further cleared anytime there is a communication error and a re-synchronization of the files is required. Next, the ($block_1$, $addressb_1$, $datab_1$), etc. requests are queued for asynchronous transmission to remote file server 118 (step 608). After the requests are queued, the data is written into the data file on primary server 102 (step 610). Embodiments employ queues capable of holding a large number of pending requests. If the queue is full, indicating that the steady-state rate of writes exceeds the available bandwidth of the link between primary server 102 and remote server 118, a waiting cycle is imposed. The waiting cycle causes the system to wait until the queue has room for the requests. This implementation matches steady-state file writes with the available bandwidth of the link.

When network 116 is ready to handle transmissions of the next packet, the system attempts to remove as many of the (block, addressb, datab) requests as will fit into a given packet after compression and encryption on primary server 102. Maximizing the amount of data per packet increases the operational efficiency of the system when replicating data to remote server 118. A cumulative signature is computed for each packet and the respective meta-data file 404 is updated with this signature. The modified BTS is sent along with the (block, addressb, datab). In situations where an entire block is transmitted, an absolute signature is computed and sent.

Figure 6B:
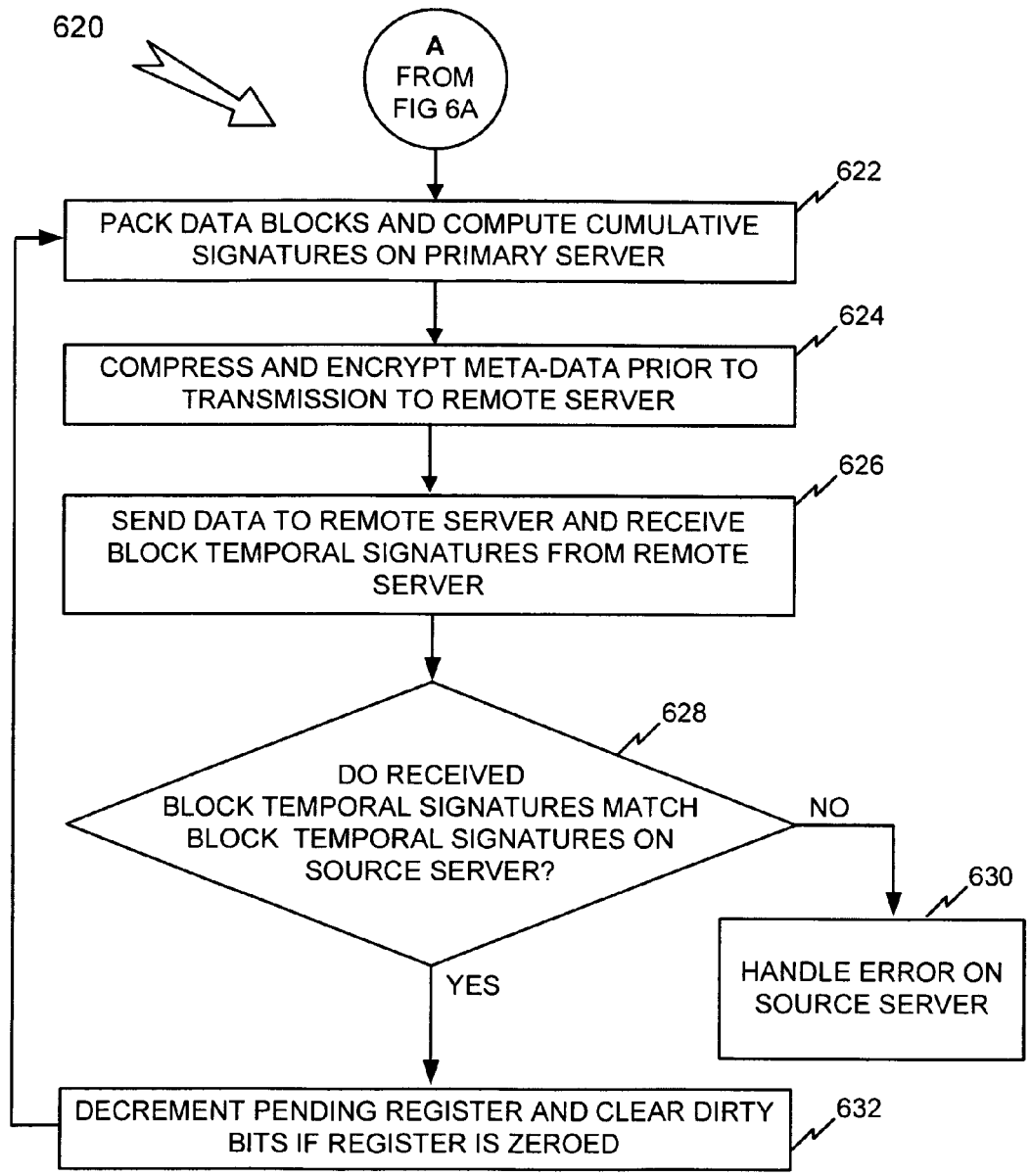

FIG. 6B illustrates a more detailed implementation of step 608 (FIG. 6A) as used to facilitate communication to remote file server 118. Method 620 begins with computation of a cumulative signature for each packet that will be transmitted to remote file server 118 (step 622). The packets are then compressed and encrypted (step 624). The compressed/encrypted packets are then transmitted to remote file server 118 using network 114, and the BTS of each packet is received from remote server 118 (step 626). Then, a determination is made based on the received BTS's to determine if data was transmitted successfully (step 628). If data was not successfully transmitted, the resulting errors are handled in step 630.

Error recovery may consist of emptying the queue, disabling file writes, clearing any pending counters, and starting a re-basing process such as that discussed in conjunction with FIG. 5B. In contrast, if data was successfully transmitted, the block's BTS is updated with a new transaction number and a pending counter corresponding to each BTS is decremented (step 632). In step 632, if a block's counter is zero, the block's status is set as non-dirty since all write requests for the block, including those pending in the queue, have been executed. After performing step 632, method flow returns to step 622.

Exemplary Methods Operating on a Remote Server

Figure 7A:
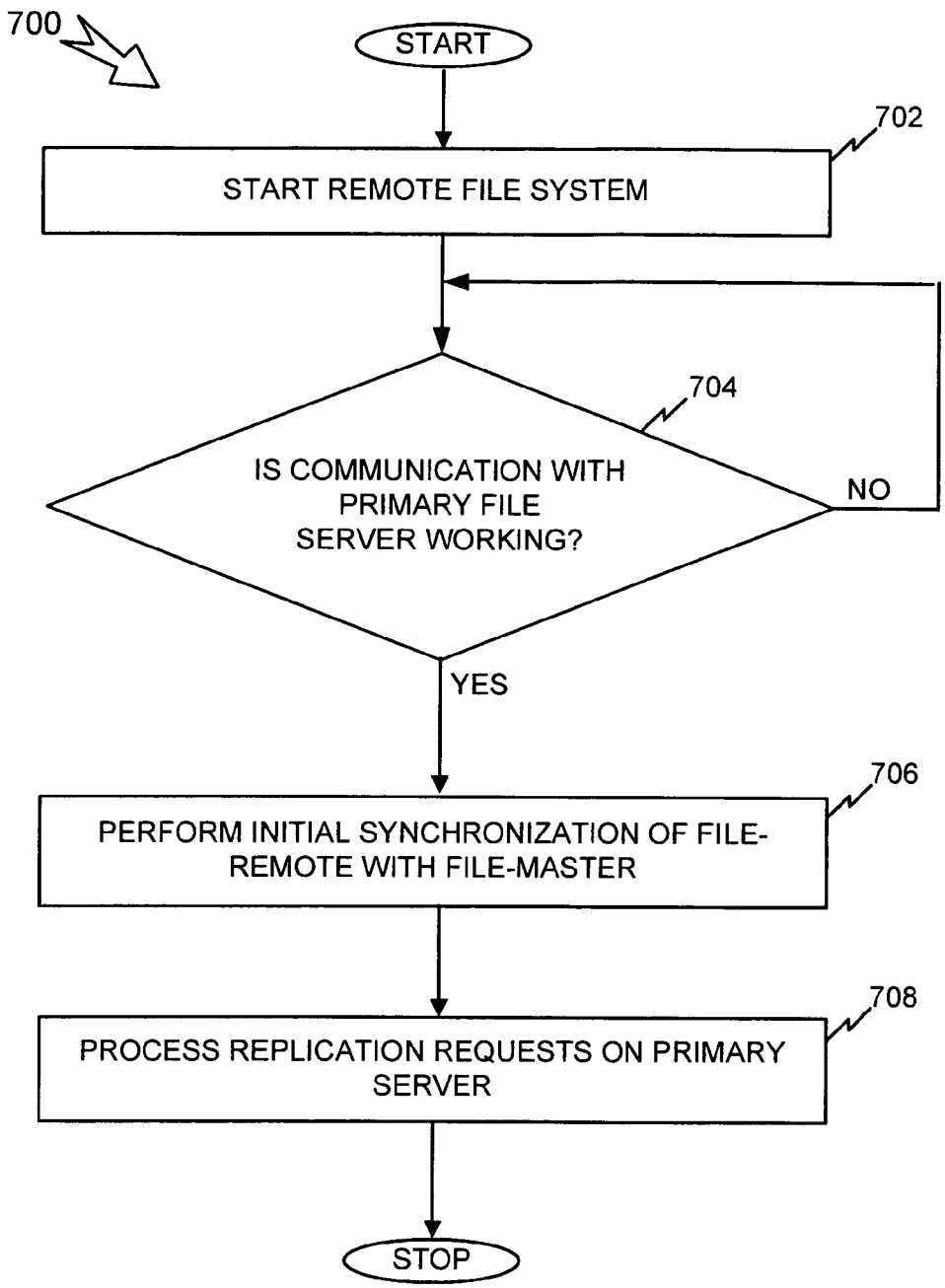
FIG. 7A illustrates an exemplary method for operating a remote file server in accordance with an embodiment of the invention.

FIG. 7A contains a flow chart illustrating the general operation of a remote file server 118. Method 700 begins when remote file server 118 is booted up (step 702). Next, remote file server 118 determines if communication can be established with primary file server 102 (step 704). If communication can be established, an initial synchronization of file-remote is made with file-master (step 706). Then, remote file server 118 processes incoming write requests received from primary file server 102 (step 708).

Embodiments may be configured so that meta-files are exchanged between source computer 102 and remote computer 118 when communications are established or when either system is booted up. For example, remote computer 118 can send its remote meta-file to source computer 102 while source computer 102 sends its source meta-file to remote computer 118. The use of meta data files lets source computer 102 and remote computer 118 reliably determine the equivalence of their respective file systems without requiring that large volumes of data be transmitted across network 114. In the event that the remote file 122 and source file 106 are different, meta data files are used to synchronize them using relatively small amounts of data.

Figure 7B:
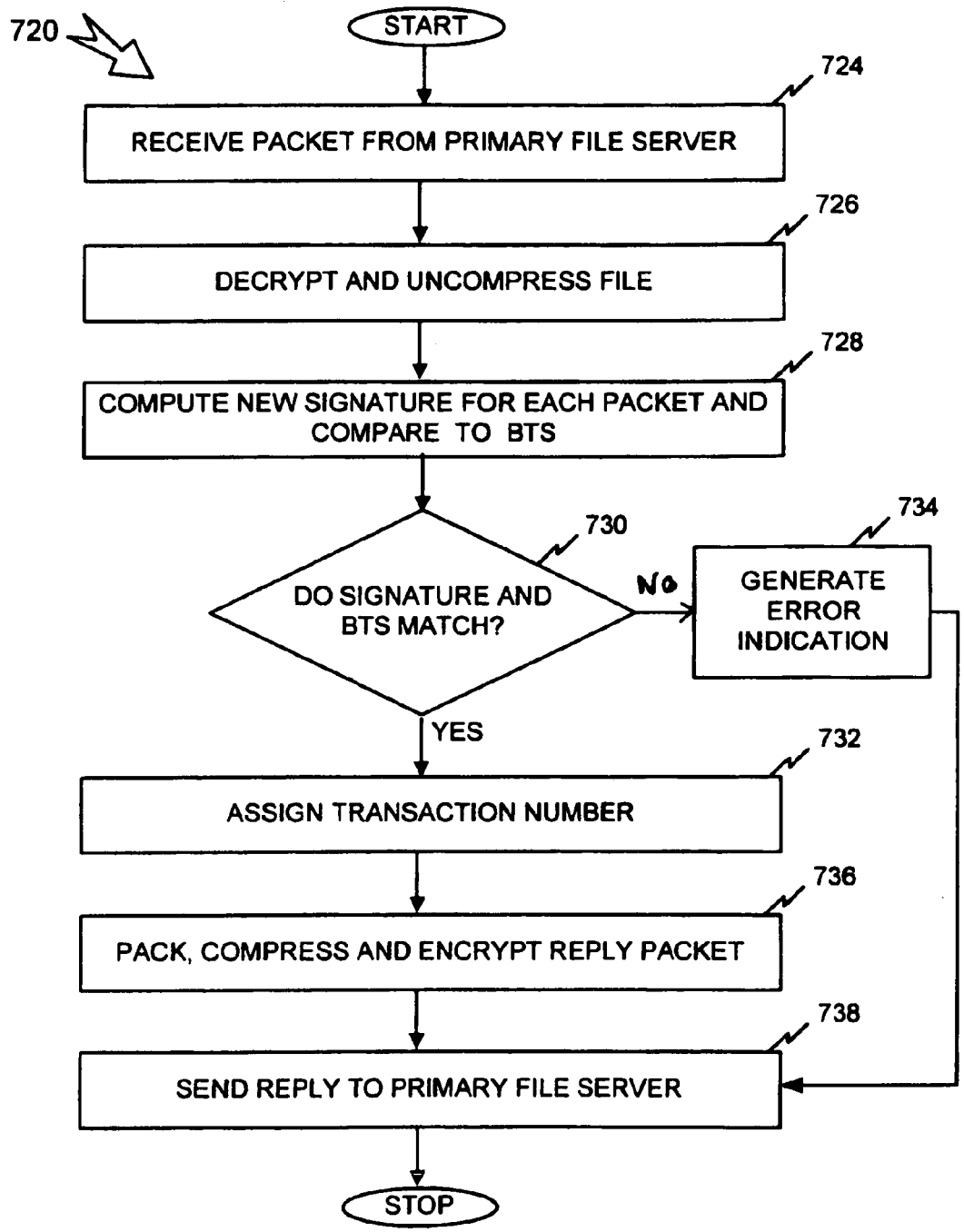
FIG. 7B illustrates an exemplary method for processing a packet received at a remote file server in accordance with an embodiment of the invention.

FIG. 7B illustrates an exemplary method practiced on remote file server 118 upon receiving a packet from primary file server 102. Method 720 begins upon receipt of a packet from primary file server 102 (step 724). The received packet may contain write requests in compressed/encrypted form. The compressed/encrypted packets are decrypted and decompressed to produce the same sequence of write requests as were sent from the primary file server 102 (step 726). For each request, remote file server 118 computes a new signature (step 728). In particular, a cumulative signature is computed unless an entire block is transmitted. And, if an entire block is transmitted an absolute signature is computed.

The signature computed by remote file server 118 is compared to the signature received from primary file server 102 (step 730). If the two signatures match, a new transaction number is created and used to update the BTS (step 732). The transaction number is stored modulo 16,772,216 in a preferred embodiment. The BTS's are then packed, compressed, and encrypted into a reply message (step 736). The reply is then sent to primary file server 102 using network 114 (step 738). In contrast, if the two signatures do not match in step 730, an error indication is generated in step 734 and sent to primary file server 102 (step 738).

The use of transaction numbers ensures that data received at remote file server 118 is a true representation of the data sent from primary file server 102. Without transaction numbers, or an equivalent mechanism, it would be impractical or impossible to determine of a true representation of transmitted data was received at remote file server 118. The transaction number provides a unique way of associating a designator, similar to version numbering, with each data block that is assigned by remote file server 118. Block temporal signatures utilizing transaction numbers make it possible to identify both the data in a given block and the order of writing of that block relative to other writes associated with other blocks and other files.

Exemplary Recovery Method

Figure 8:
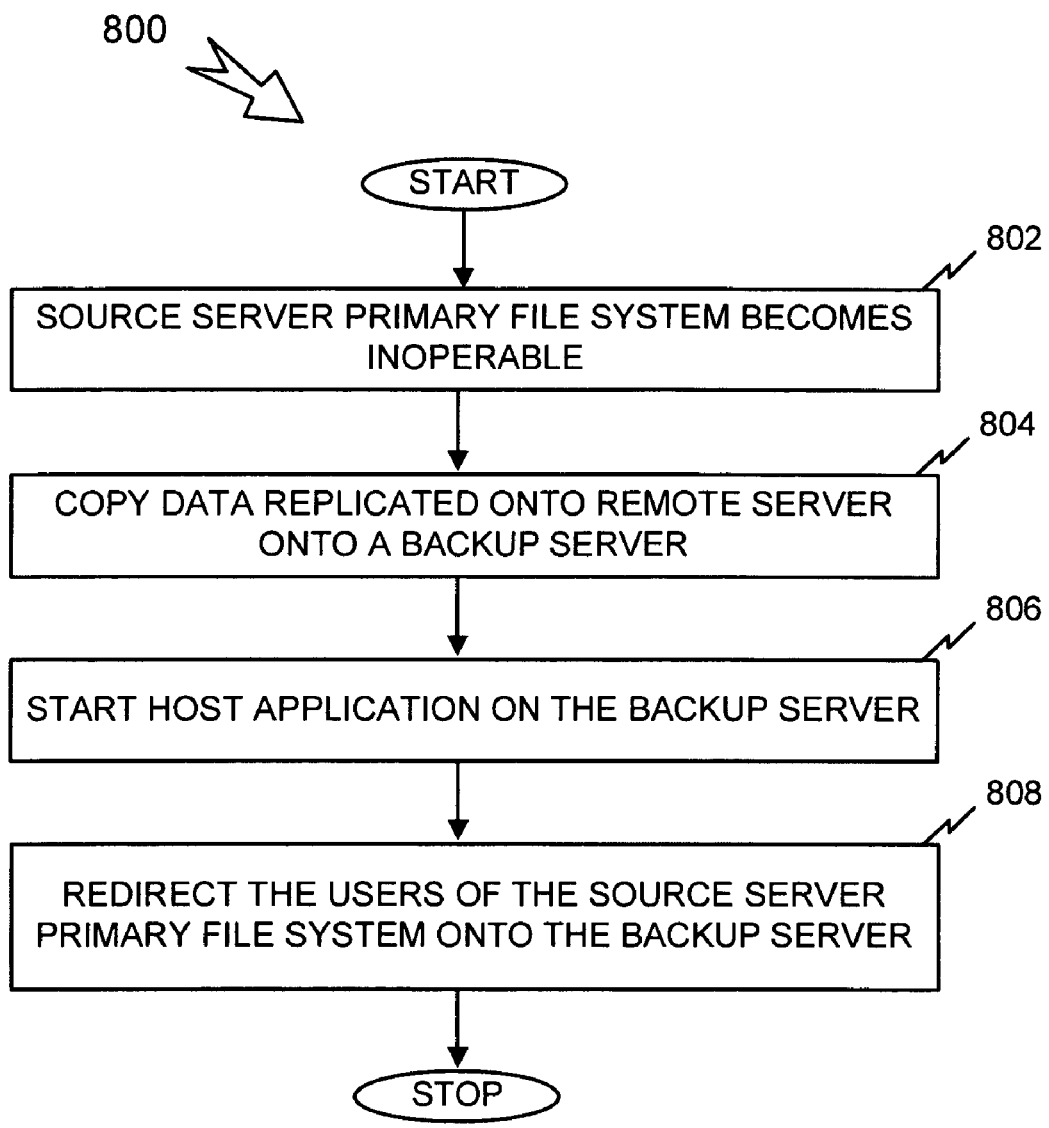
FIG. 8 illustrates an exemplary method for recovering from a malfunction associated with a primary file server in accordance with an embodiment of the invention.

FIG. 8 illustrates an exemplary method for recovering from a malfunction associated with primary file server 102. Method 800 begins when primary file server 102 becomes inoperable (step 802). When primary file server 102 becomes inoperable, a data restore operation is needed when the system is re-booted, otherwise re-started, or replaced with a different device that will operate as a primary file server 102. If a new device is employed, it is referred to as a replacement server 124. Replacement server 124 may be communicatively coupled to network 114 using a link 116 that serviced primary file server 102 or by using a different link.

When replacement server 124 is online, replicated data is copied from remote file server 118 to the replacement server 124 (step 804). After receiving the replicated data set, replacement server 124 starts a host software application that operatively communicates with or utilizes the received data set (step 806). For example, the host application may be a database application that operates on a data set containing information about employees of a particular corporation. Once replacement server 124 and the host database application are operating, users associated with the inoperable primary file server 102 can be manually, or automatically, directed to replacement server 124 (step 808). Once users are directed to replacement server 124, they can resume the normal operations that were performed with primary file server 102.

The claims should not be read as limited to the described order or elements unless stated to that effect. Therefore, all embodiments that come within the scope and spirit of the following claims and equivalents thereto are claimed as the invention.

What is claimed:

1. A computer-readable data transmission system for facilitating data replication across a data communication network, said data transmission comprising:
    a file open status indicator;
    a header portion having information useful for determining if a meta-file was properly closed;
    a block temporal signature portion having a data block signature generated using a hash function and a transaction member;
    a status portion having information about said data signature;
    wherein:
        said transaction number is generated using a remote server;
        said header portion, said block temporal portion, and said status portion are compressed and encrypted prior to being transmitted across said data communication network;
        said data block signature is computed across changed data bytes within said data block, wherein a changed data byte occurs when a data byte within said data block does not substantially match a corresponding stored data byte within a corresponding stored data block associated with a source computer; and
        said status portion includes a dirty bit if said data communications network is not available for conveying said data transmission from a source computer to a remote computer.

* * * * *